J. A. WERNER.
REGISTERING AND RECORDING MECHANISM.
APPLICATION FILED AUG. 16, 1915.

1,302,613.

Patented May 6, 1919.
15 SHEETS—SHEET 1.

Inventor
JOHN A. WERNER
Attorneys

J. A. WERNER.
REGISTERING AND RECORDING MECHANISM.
APPLICATION FILED AUG. 16, 1915.

1,302,613.

Patented May 6, 1919.
15 SHEETS—SHEET 3.

Inventor
JOHN A. WERNER
Attorneys

J. A. WERNER.
REGISTERING AND RECORDING MECHANISM.
APPLICATION FILED AUG. 16, 1915.

1,302,613.

Patented May 6, 1919.
15 SHEETS—SHEET 4.

Inventor
John A. Werner
by R. C. Glass
Carl Benst
Attorneys

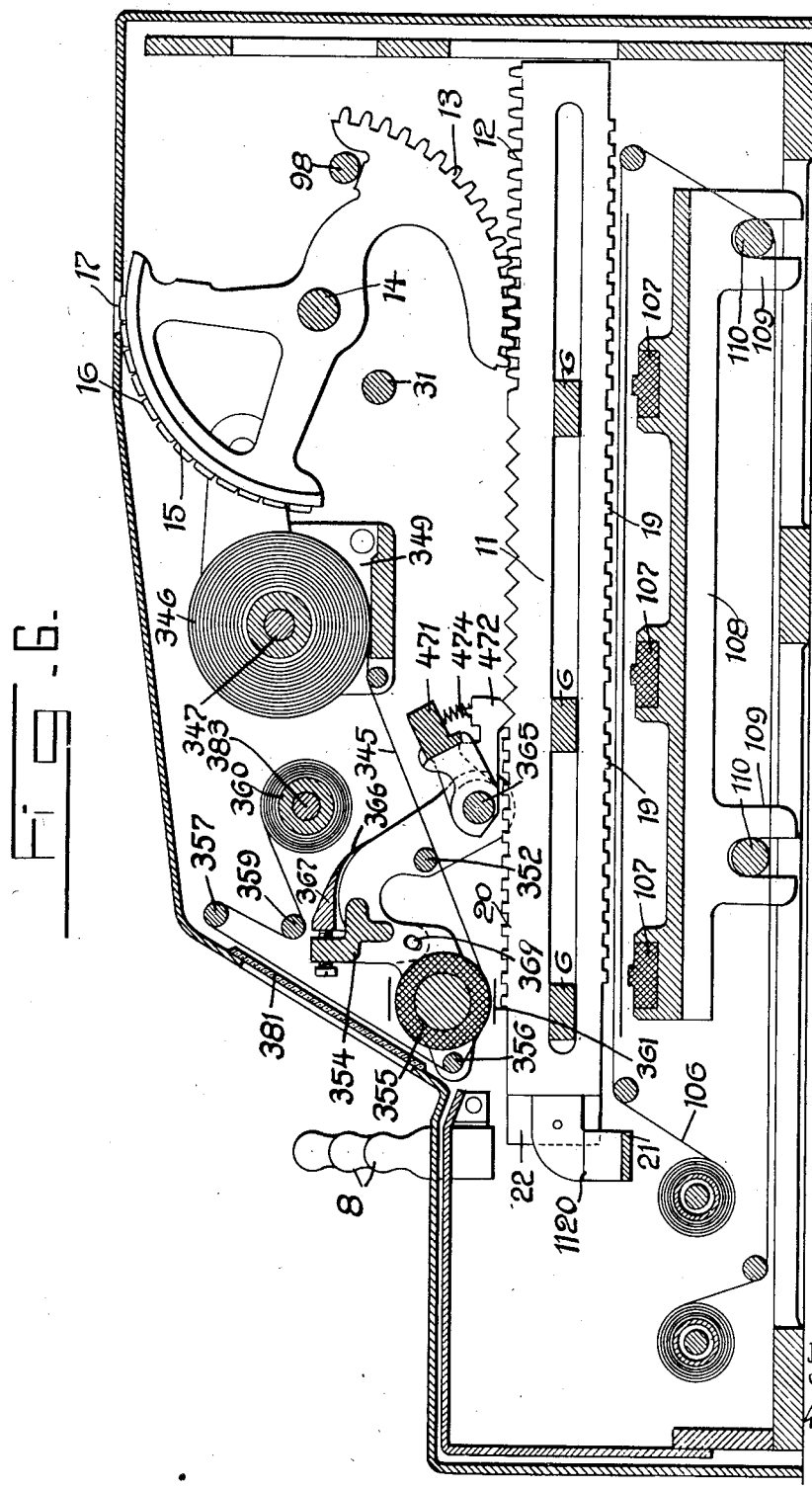

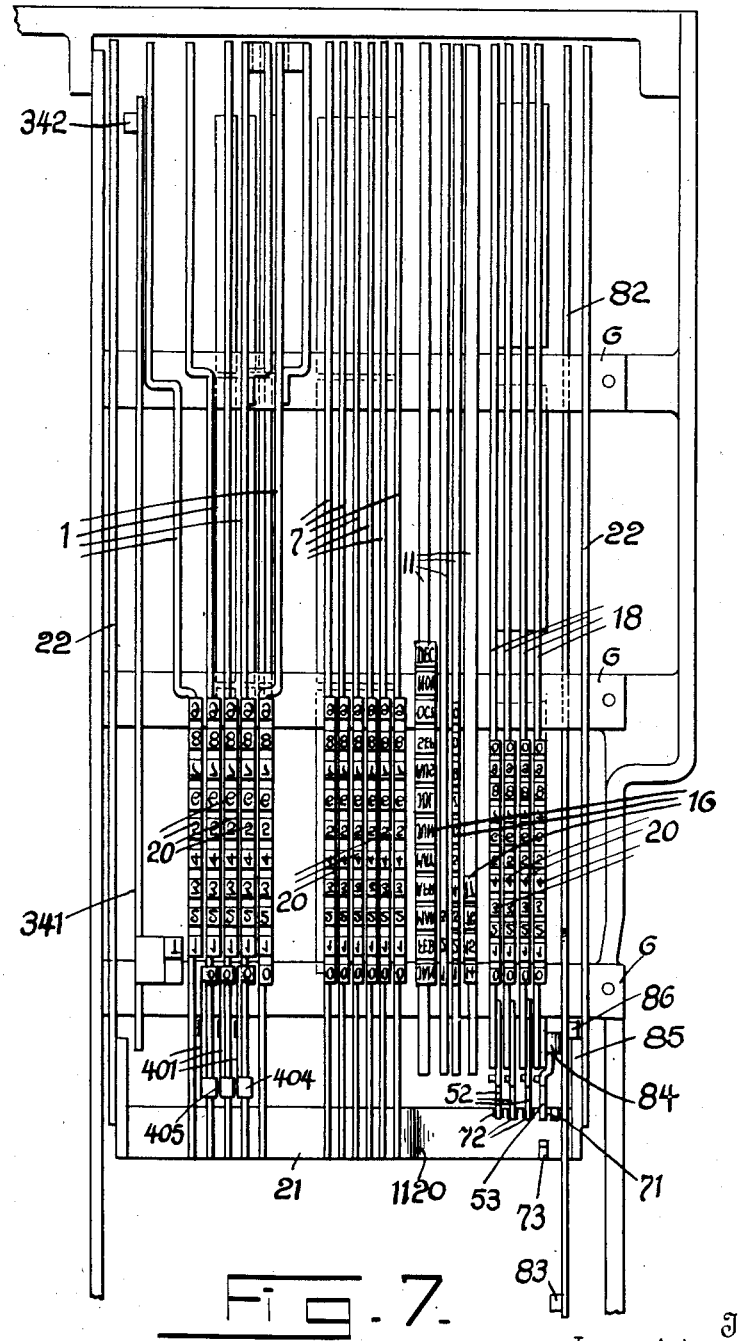

J. A. WERNER.
REGISTERING AND RECORDING MECHANISM.
APPLICATION FILED AUG. 16, 1915.
1,302,613.
Patented May 6, 1919.
15 SHEETS—SHEET 7.
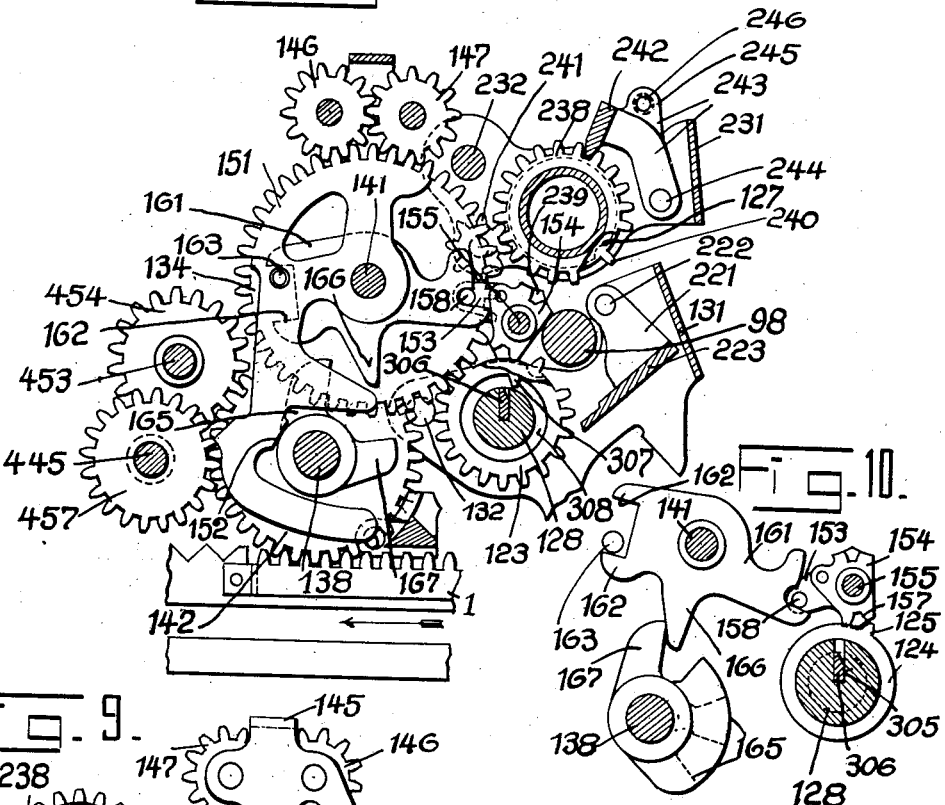
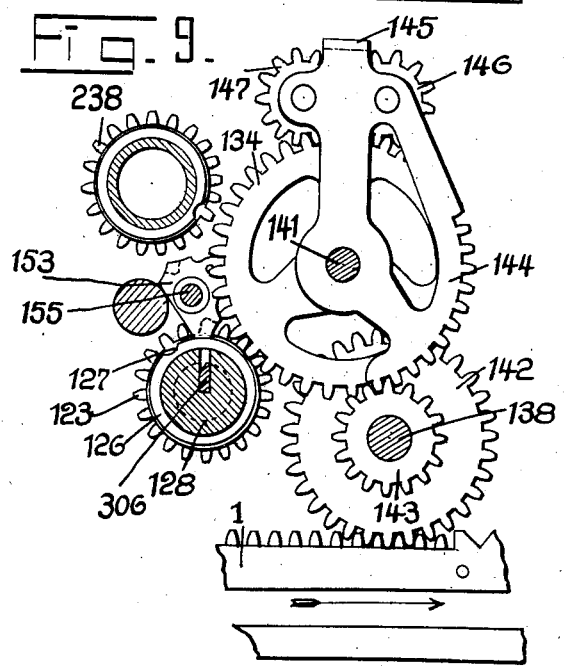
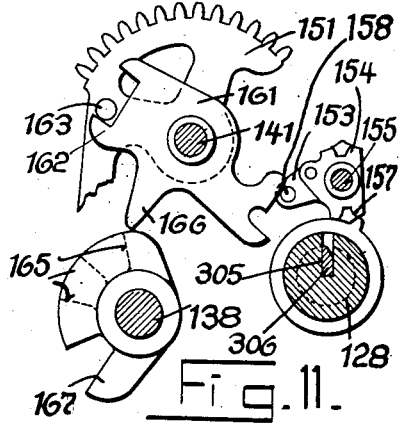
Inventor
JOHN A. WERNER J. A. WERNER.
REGISTERING AND RECORDING MECHANISM.
APPLICATION FILED AUG. 16, 1915.
1,302,613.
Patented May 6, 1919.
15 SHEETS—SHEET 8.
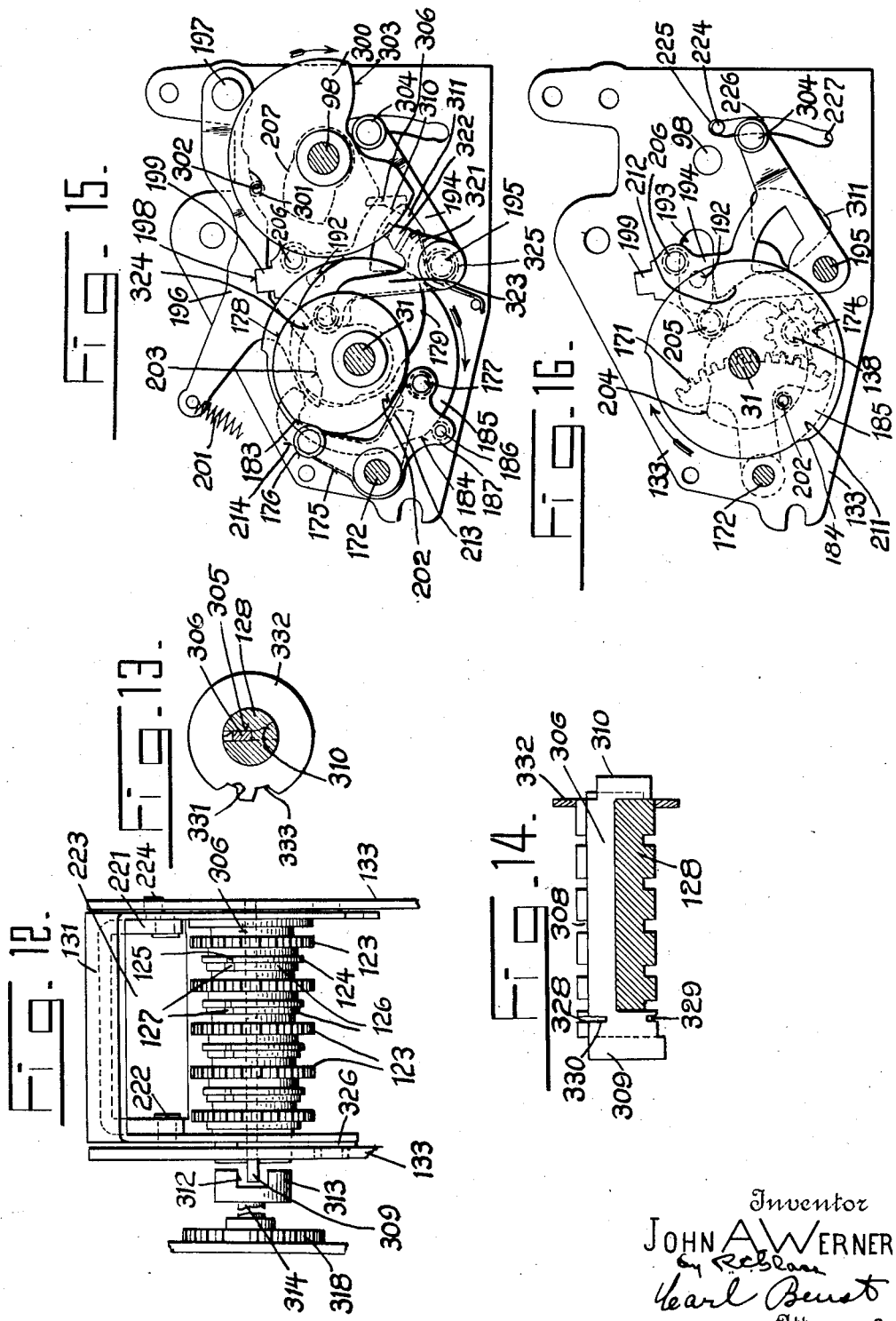

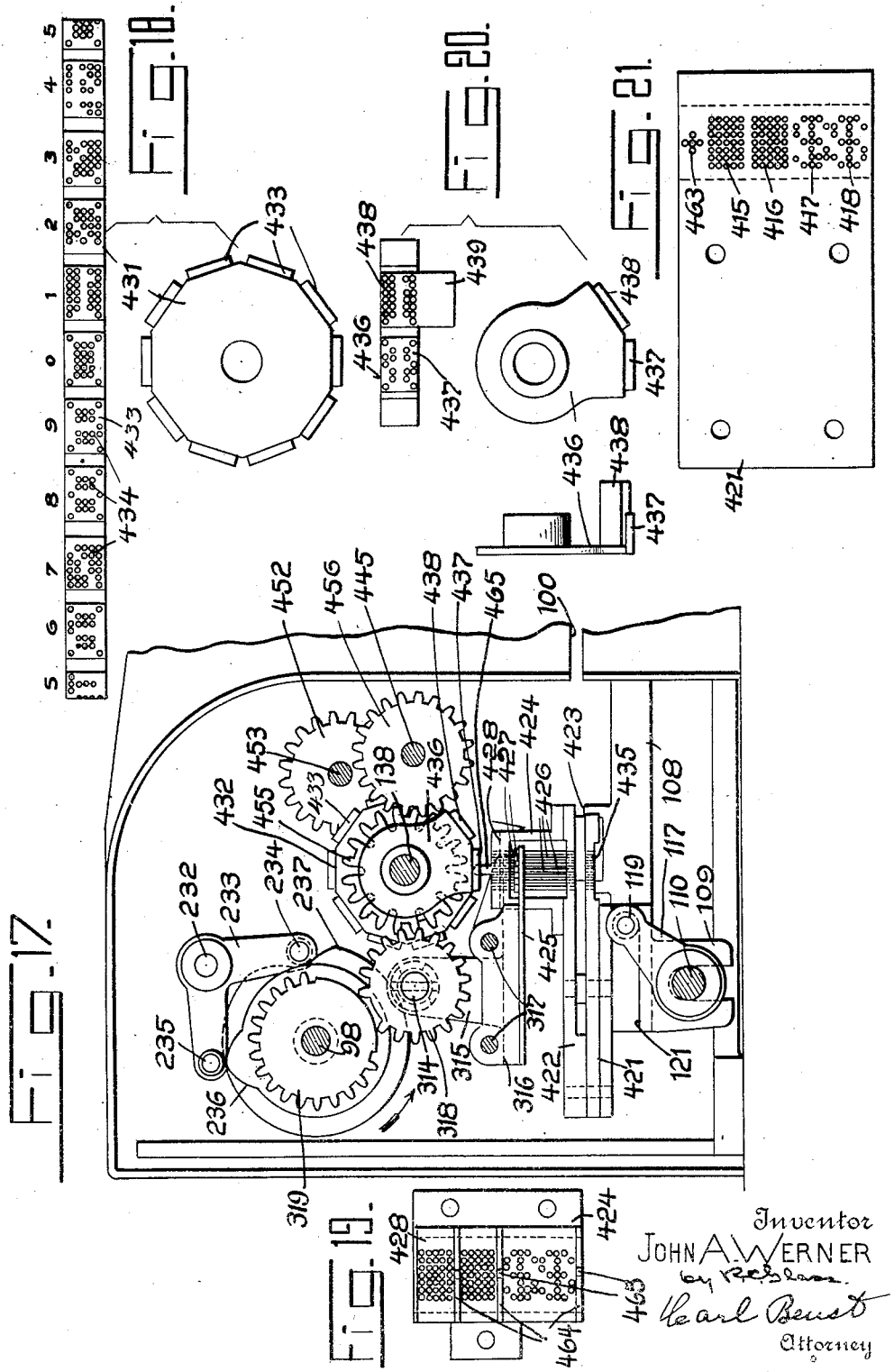

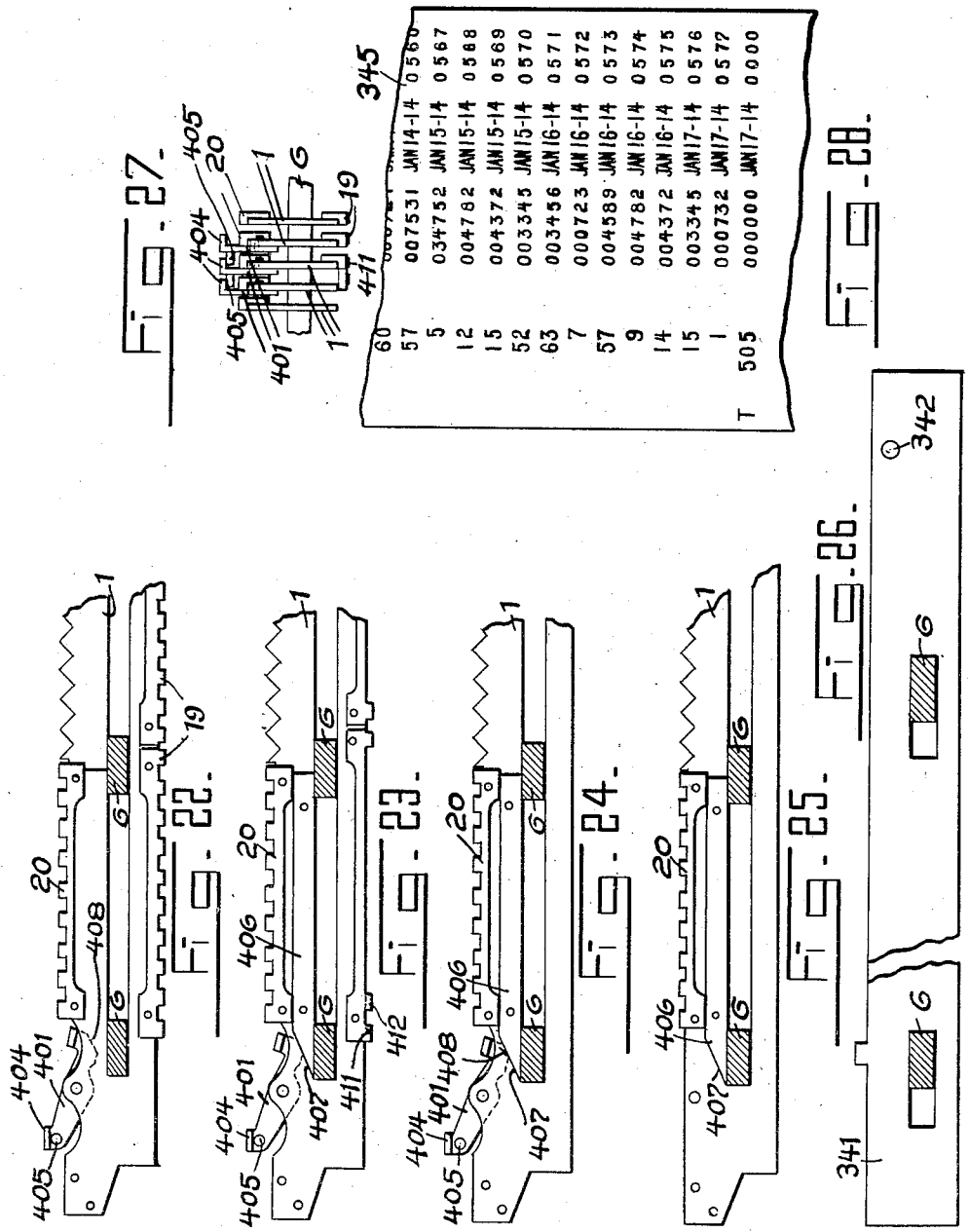

J. A. WERNER.
REGISTERING AND RECORDING MECHANISM.
APPLICATION FILED AUG. 16, 1915.

1,302,613.

Patented May 6, 1919.
15 SHEETS—SHEET 11.

Inventor
JOHN A. WERNER

Attorneys

J. A. WERNER.
REGISTERING AND RECORDING MECHANISM.
APPLICATION FILED AUG. 16, 1915.

1,302,613.

Patented May 6, 1919.
15 SHEETS—SHEET 12.

Inventor
JOHN A WERNER
Attorneys

J. A. WERNER.
REGISTERING AND RECORDING MECHANISM.
APPLICATION FILED AUG. 16, 1915.
1,302,613.
Patented May 6, 1919.
15 SHEETS—SHEET 13.
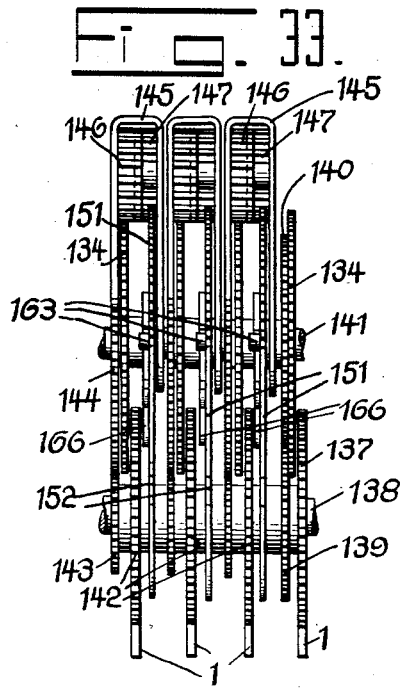
Fig. 33.
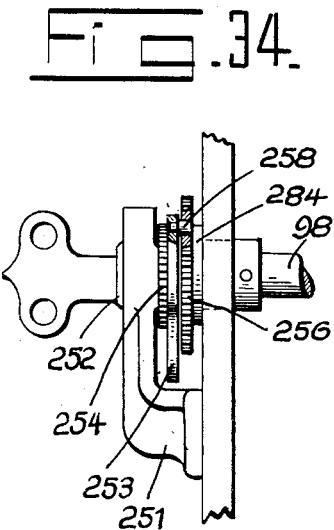
Fig. 34.
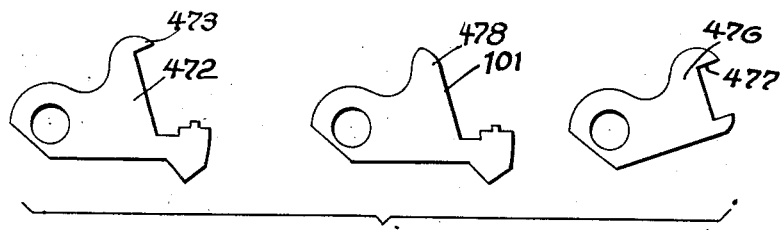
Fig. 35.
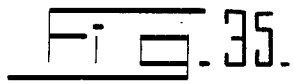
Fig. 36.
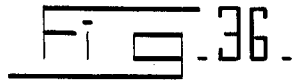
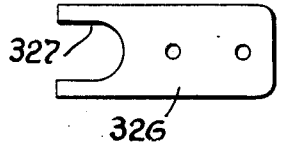
Inventor
JOHN A. WERNER
by R. C. Glass
Earl Benst
Attorneys J. A. WERNER.
REGISTERING AND RECORDING MECHANISM.
APPLICATION FILED AUG. 16, 1915.

1,302,613.

Patented May 6, 1919.
15 SHEETS—SHEET 14.

Inventor
JOHN A. WERNER
Attorneys

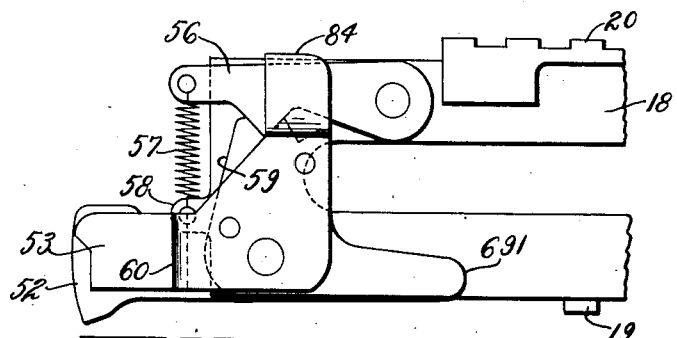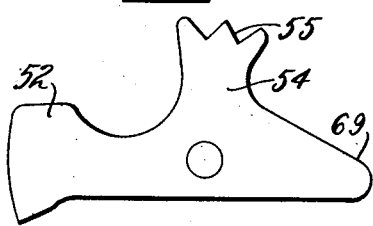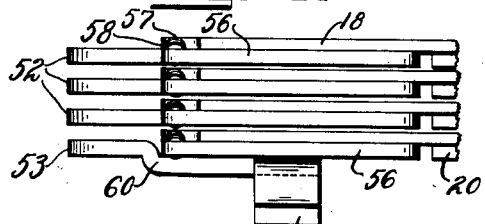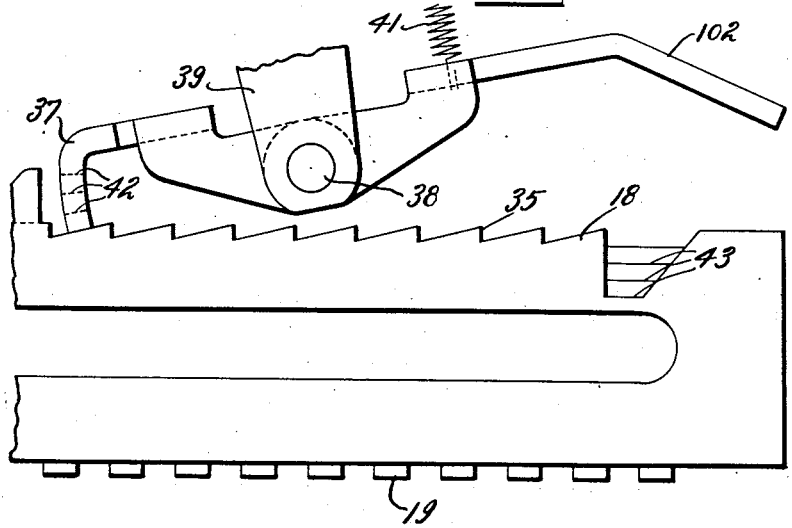

UNITED STATES PATENT OFFICE.

JOHN A. WERNER, OF DAYTON, OHIO, ASSIGNOR TO THE NATIONAL CASH REGISTER COMPANY, OF DAYTON, OHIO.

REGISTERING AND RECORDING MECHANISM.

1,302,613.      Specification of Letters Patent.      Patented May 6, 1919.

Application filed August 16, 1915. Serial No. 45,702.

*To all whom it may concern:*

Be it known that I, JOHN A. WERNER, a citizen of the United States, residing at Dayton, in the county of Montgomery and State of Ohio, have invented certain new and useful Improvements in Registering and Recording Mechanism, of which I declare the following to be a full, clear, and exact description.

This invention relates to accounting machines and its broad object is to provide a simple, durable machine for doing certain work in the way of printing, perforating and totalizing.

The illustrative machine shown in the drawings is designed for use at the postal savings windows of post offices. It prints the same set of data simultaneously on each of three coupons, in this instance, the original, duplicate and triplicate copies of a postal savings certificate, and perforates the amounts in the original so as to prevent alteration. It also retains in its interior a printed record of the data printed on the certificate and adds on a totalizer the amounts of the various certificates as they are issued. At the end of a day or any other desired period this totalizer, which is usually referred to hereinafter as the sub-totalizer, may be cleared and the total printed. As an incident to clearing and printing, the sub-total is entered on a grand totalizer of the tied-up type, that is, one which is not intended to be cleared. The machine is not, however, limited to use only in connection with issuing postal savings certificates but may readily be employed in part or as a whole for many other purposes.

One of the subordinate objects of the invention is to provide an improved totalizing mechanism. In the form shown this mechanism comprises a set of manually adjustable racks, and connections including a system of planetary gearing whereby differential adjustment of the racks to set up amounts will rotate the wheels of the totalizer accordingly. Any elements which during this rotation pass the transfer positions will trip transfer devices, but these devices may be restored by reverse correcting movement of any racks and totalizer elements which may accidentally have been given too great an extent of movement.

Another object of the invention is to provide a single novel transfer mechanism which may be used for both the sub-totalizer and the grand totalizer. This mechanism is normally controlled by the elements of the sub-totalizer and operates through the planetary gearing above mentioned to impart a transfer step of movement to the actuating gears. In clearing the sub-totalizer the amount is transferred directly through the actuating gears to the grand totalizer and any elements of the latter which pass from "9" to "0" will trip the transfers. This clearing is performed manually and the transfers will be turned in to the grand totalizer during subsequent operation of a main driving device.

Another object of the invention is to provide an improved total taking mechanism. This mechanism comprises a sub-totalizer re-setting shaft carrying a spline which is normally in ineffective position. Means are provided for moving the spline to effective position and then rotating the shaft to clear the totalizer, but, as a preliminary to this, a device actuated by the main driving mechanism is operated to adjust the shaft and spline to correct starting position in case they should have become displaced. The clearing movement of the resetting shaft is imparted by a manually operated clearing mechanism, the first movement of which will turn the driving mechanism just far enough to effect adjustment of the spline and shaft to the starting point, and then lock the driving mechanism against further movement until the clearing is completed. The operation of the driving mechanism must then be completed, thereby printing the total and preparing the machine for the first certificate printing operation.

Another object is to provide an improved consecutive numbering device constructed and operated in such a way as to be capable of printing the same consecutive number in a plurality of different positions. In the present embodiment the consecutive numbering device employs a set of racks carrying four sets of type. During operation of the machine these racks are moved endwise in one direction until they have completed their accounting movement when they are positively restored to their starting positions.

Another object is to provide an improved perforating device for perforating amounts, the idea being to produce a device which is peculiarly adapted to use in cash registers and similar machines. The punch controlling dies are rotatably mounted and have faces arranged to operate only certain punches in a plurality of groups. Said faces are arranged to permit movement of the non-perforating punches and to stop the punches which are to perforate. The paper in which the perforations are to be made is carried against the punches by a plate having holes to receive the punches which perforate, the paper serving to raise the non-perforating punches into the holes in the controlling dies.

With these and incidental objects in view the invention consists in certain novel features of construction and combinations of parts the essential elements of which are set forth in the appended claims and a preferred form of embodiment of which is hereinafter described with reference to the drawings which accompany and form part of this specification.

Of said figures:—

Fig. 4 is a section through the machine taken at the right of the units consecutive number slide.

Fig. 5 is a detail of some of the mechanism employed in restoring consecutive number slides after transfers have been effected.

Fig. 6 is a section taken through the machine at the right of the date slides.

Fig. 7 shows the relative location of the various slides in the machine and also shows some of the mechanism for returning slides to their starting points.

Fig. 8 is part of a section taken at the right of the tens totalizer wheel and shows certain features of the totalizer actuating and transfer devices.

Fig. 9 is a left elevation of one of the planetary gear units for operating the totalizer and also shows some of the mechanism associated therewith.

Figs. 10 and 11 are details of transfer mechanism and show the mechanism at different points in a transferring operation.

Fig. 12 is a detail of the sub-totalizer and some of the mechanism for clearing it.

Fig. 13 is a detail of a locking disk for the resetting shaft and the resetting spline carried in the shaft.

Fig. 14 is a longitudinal section through the zero setting shaft and shows the construction of the spline carried in the shaft.

Fig. 15 is a detail of some of the totalizer engaging and transfer operating mechanism.

Fig. 16 is a detail of the totalizer engaging lever and mechanism for operating the transfer cam shaft.

Fig. 17 is a section taken inside of the left hand side frame and shows some of the totalizer clearing mechanism. It also shows some of the mechanism for engaging the grand totalizer with the actuating gears on clearing operations as well as the perforating devices.

Figs. 18, 19, 20 and 21 are details of various parts of the perforating mechanism.

Figs. 22, 23, 24 and 25 show the forward ends of the amount printing racks, the main object being to show the construction of the zero eliminating mechanism.

Fig. 26 is a detail illustrating the construction of the slide for printing a character to designate totals.

Fig. 27 is a detail showing the assembled relation of the slides for printing amounts and the character designating totals.

Fig. 28 is a fragment of a record strip printed by the machine.

Fig. 33 is a detail of totalizer actuating and transferring mechanism, the purpose being to give a satisfactory idea of the construction and operation of the planetary gearing.

Fig. 34 is a detail of the turn to zero lock for the sub-totalizer and some of the mechanism associated therewith.

Fig. 35 is a group of details of slide alining pawls and spacing plates used to hold the pawls in proper relation on their supporting shaft.

Fig. 36 is a detail of the plate for preventing endwise movement of the sub-totalizer shaft and resetting spline.

Fig. 38 is a detail of pawls forming a part of the mechanism for returning the consecutive number slides to their starting point after they have completed their accounting movements.

Fig. 39 shows one of the restoring pawls associated with the higher order consecutive number slides.

Fig. 40 is a top plan of the forward ends of the consecutive number slides and the pawls and other devices carried thereby.

Fig. 41 is an enlarged view of the pawl for operating the consecutive number slides and is intended particularly to show the arrangement of the deep notches with which the pawl coöperates to effect transfers.

Figure 1:
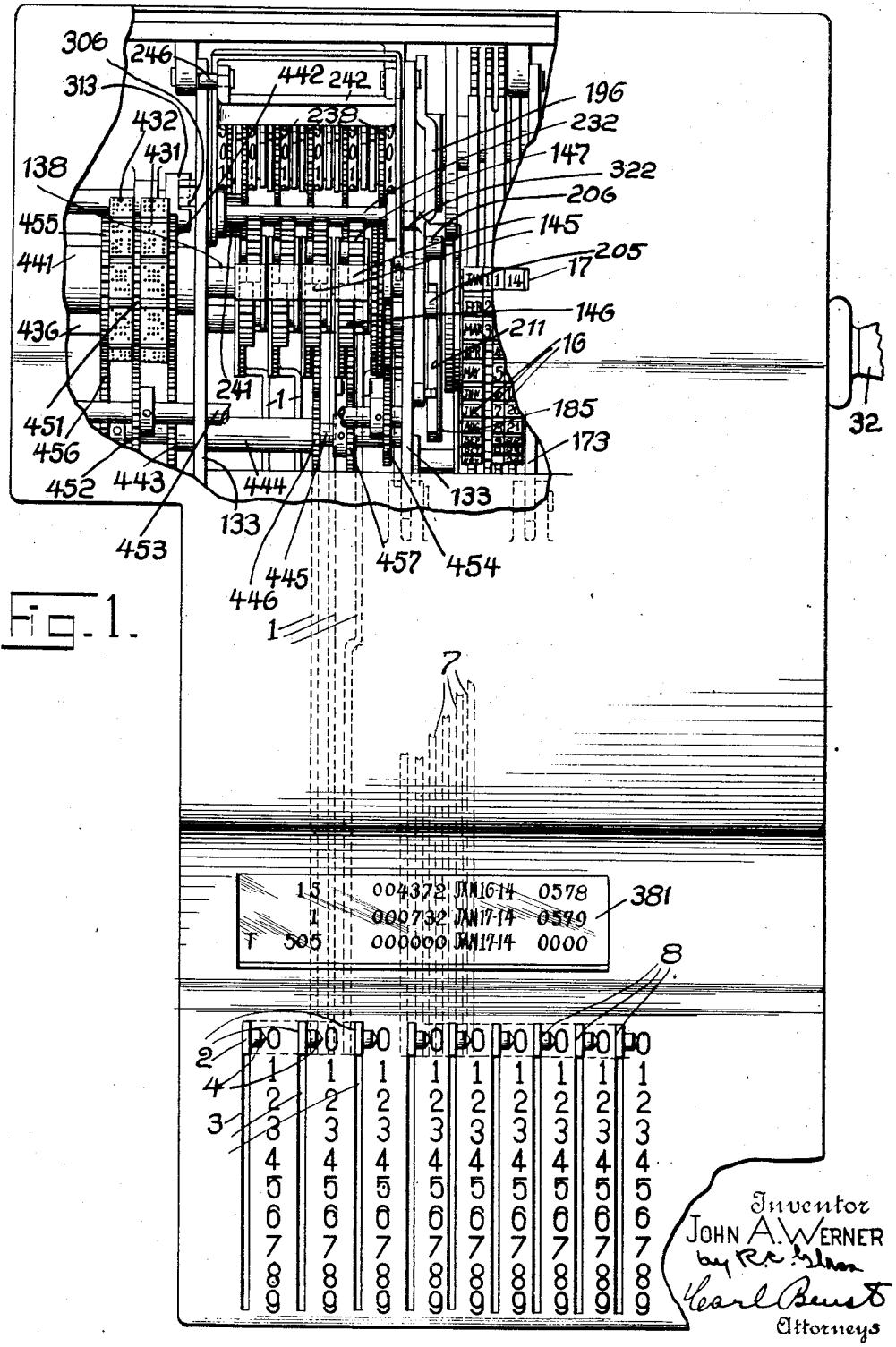
Figure 1 is a top plan view of the assembled machine with the casing broken out to show certain features of the mechanism.

The machine is arranged to print upon the three coupons of postal savings certificates inserted through a slot in the left hand side of the casing. It prints on each of the coupons the amount for which the certificate is issued, the account number of the depositor, the consecutive number and the date on which the certificate is issued. In addition to this, it perforates in the original the amount of the certificate, the idea of perforating being, of course, to prevent alteration. The original or perforated coupon is to be given to the depositor, one of the others is retained by the local postmaster and the third is to be sent to the Post Office Department in Washington or to a central office where records for a number of branch offices are kept.

The amounts and the account numbers are set up by manually adjusting a set of racks or slides which extend from front to rear and carry four sets of type, three sets on the lower edges to print on the coupons of the certificate and one on the upper edge to print on the record strip. Adjustment of the amount slides also positions devices controlling the selective operation of grouped punches so that when the driving mechanism is operated the amount will be perforated in the depositor's coupon. After the printing and perforating have taken place the amount and account number slides are automatically returned to their zero positions.

The date printing slides are substantially the same in construction as the amount and account number slides but are adjustable in rather a different way and are not returned by operations of the machine.

The consecutive number is printed from a set of slides having four sets of type arranged the same way as described in connection with the amount and account number slides. These consecutive number slides are actuated by an invariably moved driving pawl arranged to impart a step-by-step movement to the slides, the pawl also operating on the well known deep tooth principle to effect transfers from lower to higher order slides. The type on each slide are arranged 01234567890, and as the transfers occur the racks are advanced from the "9" to the second "0" position ready to print the correct consecutive number at the beginning of the next operation of the machine. Toward the end of this next operation, the units slide is positively returned to "1" and any higher order slides which may have turned in transfers will be restored to their first "0" position. At the end of the day or whenever the sub-totalizer is cleared and the sub-total printed, the consecutive number device slides are all moved by the clearing mechanism back to a position where they will all print from their first zeros at the beginning of the succeeding operation of the driving mechanism. During the latter part of the total printing operation the units slide will be advanced a step to print "1" on the first certificate issued.

The sub-totalizing mechanism is driven by operation of the manually adjustable amount racks or slides, these slides driving planetary gearing arranged not only to actuate the totalizer in adding operations but also to effect transfers from lower to higher denominations when the driving mechanism is subsequently operated. The advantage of the construction in this respect is that it requires no complicated differential mechanism and leaves practically all of the movement of the driving mechanism for doing work other than totalizing.

The total taking mechanism comprises a key operated lock and connections whereby turning the key will clear the sub-totalizer, set the amount type carrying slides to represent the sub-total and actuate the grand totalizer. The first movement of the lock will impart a slight movement to the driving mechanism and then lock the mechanism against further operation until the resetting key has been turned the rest of a complete rotation. This partial movement of the driving mechanism is to position parts of the clearing mechanism at correct starting position. Owing to a loose connection intermediate the key operated lock and the totalizer resetting shaft, the complete rotation of the resetting key does not bring the clearing mechanism to normal; in fact the clearing mechanism is stopped short of normal position by devices arranged in such a way that the operation of the driving mechanism must then be completed. Completing the operation of the driving mechanism prints on the record strip the sub-total set up on the type carriers and restores the mechanism to normal ready for operation to issue certificates.

The grand totalizer is arranged to receive all of the totals cleared from the sub-totalizer and is operated only during clearing operations. It is not arranged to be reset, in fact, the casing of the machine may be so arranged that access cannot be had to the grand totalizer by the operator. This affords a means whereby a very satisfactory additional check may be had upon the records of the post-master or postal savings clerk.

*Slides and slide restoring mechanism.*

The machine has five amount slides 1 (Fig. 2), three of which, the units, tens, and hundreds of dollars slides, have handles 2 (Fig. 1) extending through slots 3 in the casing and carrying pointers 4 to assist in accurately positioning the slides with reference to scales stamped or otherwise marked adjacent the slots. The remaining two of the five amount slides, that is the thousands and tens of thousands dollar slides, are operated only by the sub-totalizer during the sub-total printing operations. No provision is made for entering units and tens of cents, as postal savings certificates are not issued for fractional parts of a dollar. Two small zeros appear in the cents positions on the certificates, (Fig. 37), but these are not, in this instance, printed by the machine. They are already on the certificate and suitable guides (not shown) are provided so that the certificates may readily be inserted properly to bring the printing of the dollars in correct relation with the previously printed zeros for cents. All of the slides 1, as well as the other slides hereinafter mentioned, have long slots 5 through which extend transverse bars 6 having grooves (not shown) limiting the slides to endwise movement. The machine also has six depositors' account number slides 7 with handles 8 whereby they may be adjusted to set up numbers in the same way as the amounts are set up by operation of the handles 2. To the right of the account number slides are four date slides 11 (Figs. 6 and 7). These date slides have rack teeth 12 at their rear ends engaging the teeth of segmental racks 13 pivoted on a rod 14. Rigid with the segmental racks are segments 15 carrying characters 16 representing the months, days and years. An opening 17 in the casing permits manually moving the segments 15 and thereby the racks 11 to set up the dates. To the right of the date slides are four consecutive number slides 18 (Figs. 4 and 7) which are operated in a manner to be fully described later on.

As already stated, and as will be seen by referring to the various figures, all of the slides have three sets of type 19 on their lower edges and a set 20 on the upper edges, except the two highest order amount slides operated by the sub-totalizer in sub-total printing. These two slides are in the present instance, intended to print only on the record strip and have therefore but the one set of type 20. At the beginning of an operation the handles 2 and 8 (Fig. 1) are adjusted along the scales to set up the amount of the deposit and the account number of the party making the deposit. This, as will appear clearly later, enters the amount of the sub-totalizer and positions the lower sets of type to print on the certificate a record of the amount and the account number. The upper sets of type are, of course, also positioned at the same time to print the same information on the record strip. The actual printing is done by an operation of the driving mechanism of the machine. During such an operation and after the printing the amount slides 1 and the account number slides 7 are positively returned to their starting or zero positions.

Figure 3:
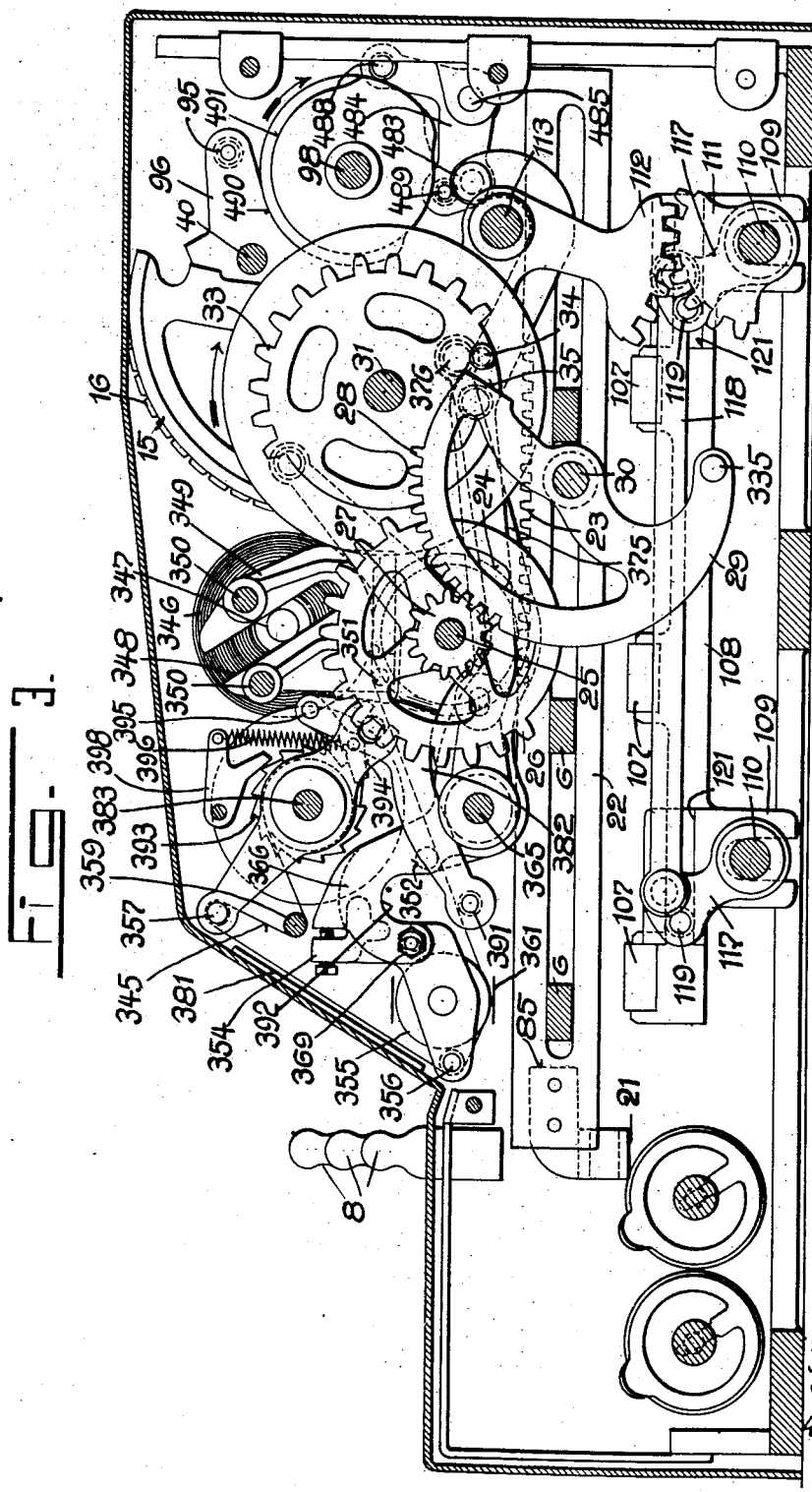
Fig. 3 is a section taken inside of the right hand side frame.

The mechanism for returning the slides includes a bar 21 extending across the forward ends of the amount and account number slides, this bar being secured at its ends to slides 22 as best shown in Figs. 3 and 7. The bar 21 is formed as at 1120 (Figs. 6 and 7) so that it extends below the path of movement of the date slides 11 and consecutive number slides 16, the arrangement being such that as the amount and number slides are moved forward their ends will engage the bar 21 and move the bar and slides 22 forward. The bar 21 and slides 22 might then be returned after the printing operation directly from the position to which they were adjusted by movement of slides 1 and 7, if it were not for the fact that the bar is used to do other work which makes it necessary for the bar to have an invariable extent of movement. In order to get this invariable extent of movement, the bar 21 and its supporting slides 22 are given a complementary movement in the same direction as that imparted by the slides 1 and 7, the idea being to complete an invariable extent of movement. The bar 21 is then returned directly to its starting position.

The mechanism for imparting the complementary movement and then restoring the bar directly to the starting position is shown in Fig. 3. The slides 22 have racks 23 on their upper edges, these racks engaging the teeth of gears (represented by the dotted lines 24) journaled on a rod 25. Rigid with the gears 24 are mutilated gears 26 and pinions 27 the teeth of the latter being in engagement with the teeth 28 of segmental racks formed on the peripheries of elements 29 journaled on stub shafts 30 supported by the adjacent machine frames. When the bar 21 and rack slides 22 are drawn forward by adjustment of the amount and account slides, the gears 24, 26 and 27 will be turned clockwise and the elements 29 counter clockwise extents corresponding to the movement of the slide 1 or 7 which is adjusted to the highest figure.

Figure 2:
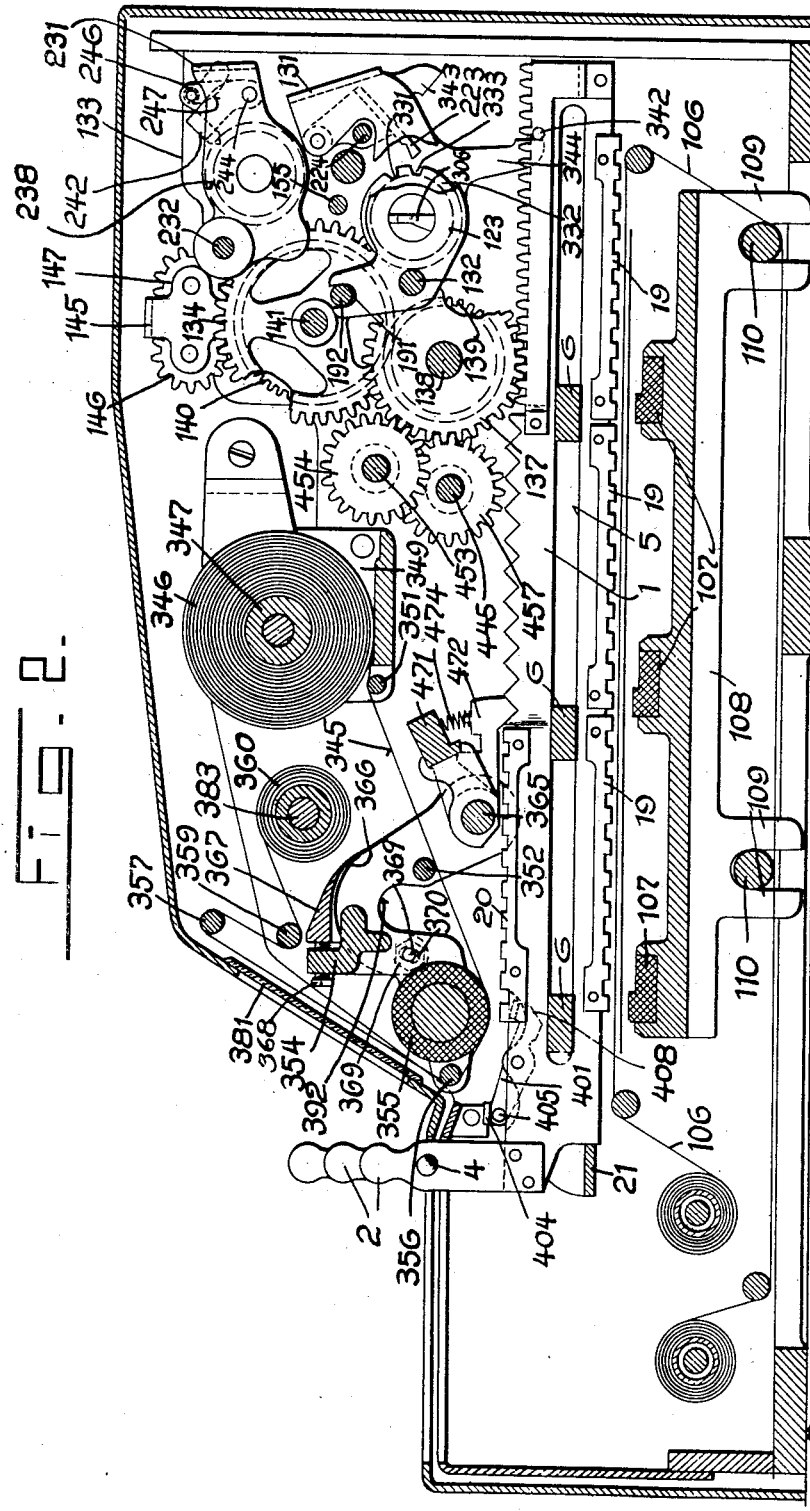
Fig. 2 is a section taken at the right of the units amount bank.

When the machine is operated to print, a driving shaft 31 is given a complete rotation in the direction of the arrow by means of an operating handle 32 (Fig. 1). Fastened to the driving shaft are mutilated gears 33, attached to the sides of which are studs 34, extending across the edges 35 of the elements 29. The arrangement is such that if no amount or account slides were adjusted the studs 34 would, when the gears 33 are turned, engage the edges 35 and cause the elements 29 and other connections to drive the bar 21 and racks 22 forward an invariable distance. This does not occur in ordinary operations, however, but the elements 29 are carried a part of the distance by adjustment of slides 1 and 7 before the machine is operated and the operation of the machine simply causes the studs 34 to move the elements 29 and other mechanism forward from the differentially adjusted position to the limit of the invariable extent of movement in one direction. This all occurs before the teeth of the mutilated gears 33 have been carried far enough to engage the teeth of the mutilated gears 26, but when the gears 33 do engage the gears 26 the latter are given an invariable extent of movement counter clockwise (Fig. 3), thereby restoring the bars 21 and any adjusted slides 1 and 7 to their normal positions.

The reason that the bar 21 is given a complementary movement to an invariable position before it is returned, instead of being returned directly from its differentially adjusted position, is that movement of the bar is used to restore the consecutive number slides 18 after they have completed their accounting movement.

*Consecutive numbering devices.*

The slides 18 are provided at their rear ends with teeth 35 (Figs. 4 and 41). Coöperating with these teeth is a pawl 37 pivoted on a stud 38 fastened to the lower end of a bell crank 39 pivoted on a rod 40, the pawl being held in engagement with the teeth by a spring 41. The pawl 37 is wide enough to extend across all of the consecutive number slides 18 and is stepped as shown at 42 (Fig. 41) to coöperate with deep notches 43 at the rear ends of the slides for the purpose of effecting transfers from lower to higher orders. The forwardly extending arm of the bell crank carries an anti-friction roller 44 projecting into a cam groove 45 formed in the side of a disk 46 fastened to the driving shaft 31. At the end of an ordinary certificate issuing operation the anti-friction roller 44 rests against the wall 47 in the widened portion of the cam groove 45 and the first movement of the shaft 31 will rock the bell crank rearward to the position in which it is shown in Fig. 4. During the latter half of the rotation of the shaft 31 the bell crank is gradually moved in the opposite direction first to engage the teeth 35 and then to advance the slide or slides 18. The purpose of the widened portion of the cam groove 45 will appear later on.

Instead of having the usual 0 to 9 arrangement of the type, each type plate 51 fastened to the consecutive number slides 18 carries 11 type 01234567890. At the time that the pawl 37 is drawn back ready to feed the slides 18 any slides that are to be moved from 9 to the second 0 will be in a position for their deep notches 43 to be engaged by the pawl. The feeding movement of the pawl will then feed the lower order slide to the second 0 and at the same time advance the next higher order slide a single step.

Pivoted to the forward ends of the three higher order consecutive number slides are pawls 52 (Figs. 4, 38, 39 and 40) while the units slide has pivoted thereto a pawl 53 which differs in several respects from the pawls 52. The pawls 52 for the higher order slides have upwardly extending portions 54 (Fig. 39) in which are notches 55 coöperating with locking pawls 56 pivoted to the slides 18 and held in engagement with the notches 55 by springs 57 stretched between ears 58 on the forward ends of the slides 18 and extensions at the forward end of the locking pawls 56. Instead of the units pawl 53 being provided with a portion like the portion 54 of the higher order pawls 52 it has a separate plate 59 attached to it. This plate is provided at its upper end with notches to be engaged by the units locking pawl 56 and the pawl is formed as shown at 60 (Figs. 38 and 40) to bring its forward end in alinement with the locking plate 59 and locking pawl 56. As the slides 18 are advanced from 9 to 10, that is, to the second 0 position, the pawls 52 and 53 are carried under a frame 61 (Figs. 4 and 5) pivoted on a rod 62 supported by the lugs 63 of a bracket 64 attached to the forward cross piece 65 of the machine framework. Rigid with the frame 61 is an element 66 having an upwardly extending stop portion 67 to engage the base plate of the bracket 64. A spring 68 normally holds the stop 67 in engagement with the plate 64, the arrangement being such that the frame 61 may be rocked clockwise (Fig. 4) about the rod 62 and then returned by the spring when the purpose of rocking the frame has been fulfilled.

At the end of each forward movement of the restoring bar 21 a finger 71 rigid with the bar strikes the element 66 and rocks it and the frame 61 clockwise (Fig. 4). If at this time the pawl 53 or any of the pawls 52 are under the frame 61 they will be rocked down so that the noses of the pawls 52 will be moved into engagement with cuts 72 in the rear edge of the bar 21 while the pawl 53 will be moved down to a position where it will be engaged by a lug 73 on the bar 21 after the bar has moved one step in the restoring direction. It is to be understood of course, that after the pawls 52 and 53 are depressed they are latched in depressed position by the locking pawls 56. The back to normal or restoring movement of the bar 21 will then restore the higher order slides 18 from their ten or second "0" position to the first "0" position while on account of the step of movement before the lug 73 engages the units pawl 53 the units slide will only be restored from its ten or second "0" position to its "1" position. For example, if the slides 18 stand at the position where they print 0009, after the impression is taken the units and tens slides will each be advanced a step ready to print 0010, thereby moving the units pawl 53 in position to be engaged by the frame 61 when the frame is rocked. After the bar 21 has moved one step rearward the lug 73 thereon will engage the end of the pawl 53 so that at the end of the restoring movement of the bar the units slide will be at "1" and the next number printed will be 0011. At the end of the restoring movement, tails 69 on the pawls 52 and a tail 691 on the plate 59 rigid with the pawl 53 will engage a bevel 70 on the forward transverse bar 6, thereby restoring the pawls to normal condition. The tail 691 on the pawl 53 is, of course, longer than the tails 69 so as to engage the bevel 70 properly when the units slide is carried back to "1."

A comparison of the cam groove 45 (Fig. 4) with the mutilated gear 33 (Fig. 3) will show that the slide operating pawl 37 is swung forward during the same time that the restoring bar 21 is moved rearward. It is, of course, apparent that in order to prevent interference the pawl 37 must be held out of engagement during operations in which slides 18 are being carried back to their starting point. For this purpose there is provided a cam plate 74 slidably supported at its forward end in a plate 75 fastened to the rearmost transverse bar 6, the rear end of the cam plate being pivotally connected at 76 with an upwardly extending arm 77, fastened to one end of a short rock shaft 78 which is journaled in a bracket 79 fastened to the rear frame of the machine. Fastened to the other end of the rock shaft 78 is a short arm 80 with two alining notches in its upper end coöperating with a spring operated alining pawl 81. Pivoted to the side of the arm 77 is one end of a long link 82 suitably formed at its forward end to be slidably supported by the foremost transverse bar 6. At its extreme forward end the link 82 is provided with a stud 83. When the units slide has completed its forward movement, an arm 84 formed on the units pawl 53 will be in contact with the stud 83, so that when the pawl is rocked by operation of the frame 61 the arm 84 will draw the link 82 forward and slide the cam plate 74 to a position where it will raise the operating pawl 37 out of engagement with the teeth 35 and hold it out of engagement during the ordinary feeding movement of the pawl. At the end of the return to normal or restoring movement of the bar 21, a portion 85 (Figs. 3 and 7) of the bar will strike a stud 86 fastened to the side of the link 82 and thrust the link rearward, thereby withdrawing the cam plate 74 from engagement with the pawl 37.

It might be well at this point to explain how the consecutive numbering device is cleared, although this is strictly speaking, a part of the total taking operation described later on. Extending through the slots in the four consecutive number slides is a roller 91 (Fig. 4) having a peripheral groove (not shown) at either end, these grooves being engaged by prongs at the lower ends of the side arms 92 and 93 of a yoke 94 pivoted on the shaft 40, the arm 93 being bowed as shown to clear the stud 38 supporting the pawl 37. The yoke 94 is normally free so that forward movement of the slides 18 will advance the roller 91 and rock the yoke about its pivotal support. As it is rocked, an anti-friction roller 95 on the side of an extension 96 on the right hand side arm of the yoke will be carried down into the path of a cam 97 fastened to a shaft 98. This shaft is manually rotated eight-ninths of a complete rotation in total taking the final one-ninth of the rotation being imparted by the driving mechanism, all of which will be explained fully in describing the total taking mechanism. It is sufficient to state here that as the shaft 98 is rotated the periphery of the cam 97 will engage the roller 95 and swing the yoke 94 rearward, the portion 99 swinging the yoke slightly beyond the zero position in which it is shown. However, it is returned to the zero position by the action of spring operated alining pawls 101 forming a part of alining mechanism which will also be described later.

It is apparent, of course, that the slides 18 could not be moved back to zero without first disengaging the operating pawl 37. For this purpose the pawl is provided with a tail 102 suitably formed to be engaged by a cam 103 fast to the shaft 98. The first movement of the shaft will swing the pawl 37 up out of engagement with the teeth 35 and hold it out of engagement until the shaft has about completed its eight-ninths of a rotation. As the slides are drawn rearward by the yoke 94 a lug 105 on the units slide will engage the pawl 37 and move it and the bell crank 39 rearwardly during the extra movement of the slides, that is, the movement beyond the zero position. This is permitted by the widened portion 47 of the cam groove 45. After the slides are brought to rest at the true zero position by the alining pawls, the various parts of the mechanism will be in the positions shown in Fig. 4. Then, when the driving shaft 31 is rotated to complete the movement of the shaft 98, the bell crank 39 will be given the normal feeding movement by the cam groove 45 thereby advancing the units slide one step ready to number properly the first certificate issued after the clearing operation.

*Certificate printing platen mechanism.*

Figure 37:
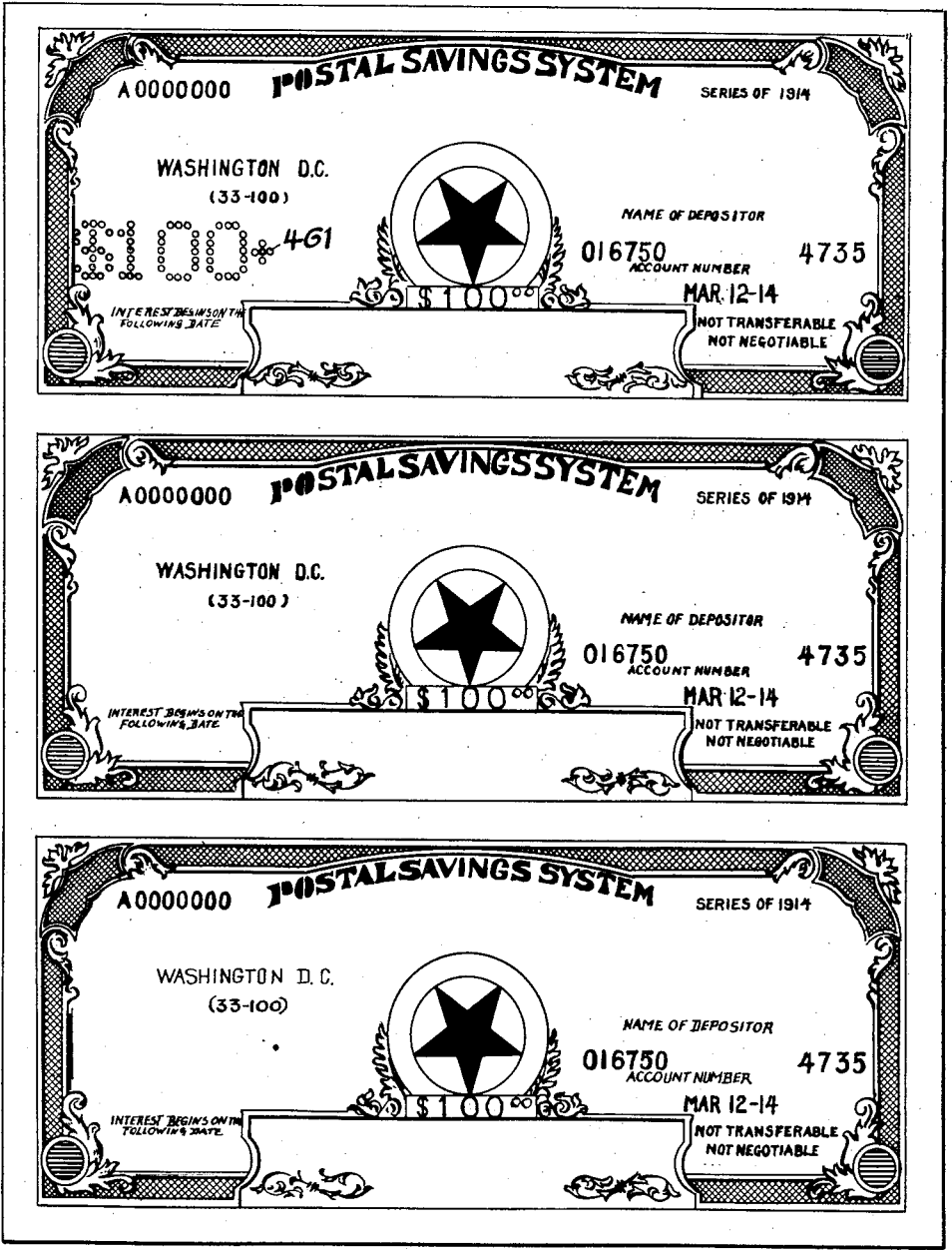
Fig. 37 shows one of the certificates printed and perforated by the machine.

By referring to Fig. 37 it will be seen that the depositor's account number and the consecutive number are printed on one line and the amount and date on another. This is, of course, effected by proper arrangement of the type carrying plates on their respective slides. The certificates are inserted through a slot 100 in the left hand side of the casing in such a way that they rest between an ink ribbon 106, and three platens 107 mounted in a frame 108 extending through under all of the slides. The platens 107 are cut away as shown in the various figures so as to print only from one type in each of the three groups on the lower edges of the slides.

Figure 32:
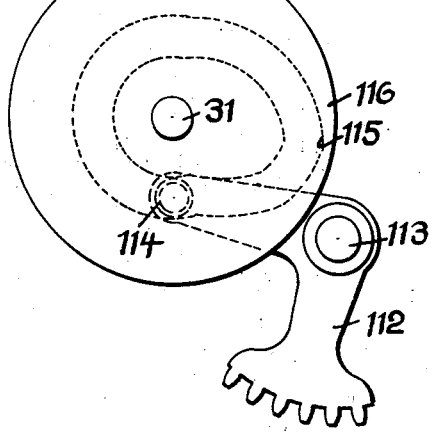
Fig. 32 is a detail of a cam and bell crank segment employed for operating the platens to take impressions upon certificates.

The platen frame 108 is provided at either side with a pair of lugs 109 having open slots engaging rock shafts 110, journaled in the side plates of the machine. Fastened to the rear shaft 110 at near its right hand end is a segment 111, meshing with the teeth of a bell crank segment 112 (Figs. 3 and 32) loosely mounted on a stub shaft 113 attached to the right side frame of the machine. The forwardly extending arm of the bell crank segment 112 has a roller 114 projecting into a cam groove 115 formed in the side of a disk 116 attached to the main driving shaft 31. Fastened to each of the rock shafts 110 is a pair of arms 117, one at either side of the platen frame 108, the arms at the right side (Fig. 3) of the frame being loosely connected by a link 118. All four arms 117 are provided with rollers 119 (Figs. 3 and 17) projecting into slots 121 cut in the platen frame 108. The cam groove 115 is so shaped that at the beginning of the rotation of the driving shaft 31 the bell crank segment 112 will be rocked counter-clockwise (Figs. 3 and 32) about the shaft 113, thereby swinging the arms 117 toward the rear and raising the platen frame 108 to press all three coupons of the certificate against the type on the under sides of the slides. Return movement of the bell crank segment is completed by the time the first half of the rotation of the shaft 31 is finished, thereby restoring the platen frame 108 and the parts associated therewith to normal position.

*Sub-totalizer operating mechanism.*

The sub-totalizer has, in this instance, five rotatable units, thereby giving it a capacity of $99,999. It will be recalled that no provision is made for entering units and tens of cents for the reason that postal savings certificates are not issued for fractional parts of a dollar. Each of the units of the sub-totalizer comprises a gear 123 (Figs. 8, 9, and 12). Rigid with each gear is an element 124 on which is formed a transfer tooth 125 and a locking ring 126 provided with a cut 127 in alinement with the transfer tooth 125. These units are rotatably mounted on a shaft 128 journaled in the side plates of a yoke shaped frame 131 which is pivoted on studs 132 (Figs. 2 and 8) attached to supporting plates 133 (Fig. 1) forming a part of the frame work of the machine. The frame 131 is normally held in such a position that the gears 123 are in engagement with totalizer actuating gears 134. These actuating gears are rotated directly by adjustment of the three manually operated amount slides 1, thereby rotating the totalizer gears 123 differentially to extents depending upon the amounts set up on the amount slides.

The units totalizer element, of course, receives no transfers from a lower order, so its operating mechanism differs slightly from the operating mechanism provided for the higher order units. As shown in Fig. 33, the units slide 1 is constantly in mesh with a gear 137 loosely mounted on a rock shaft 138. Rigid with the gear 137 is a gear 139 slightly smaller in diameter than the gear 137 and constantly in mesh with a gear 140, journaled on a rod 141. Fastened to the side of the gear 140 is the actuating gear 134 for the units of dollars totalizer element. As the sub-totalizer is normally in engagement with the gears 134 it is, of course, clear that any number of units from one to nine may be entered directly on the units totalizer element by simply drawing the units slide 1 forward to the desired position. The higher order slides 1 transmit their actuating movement through a planetary gear movement which also permits operation of the actuating gears 134 an additional step for the purpose of effecting transfers. The rack teeth on the higher order slides are in engagement with gears 142, (Figs. 8, 9, and 33) loose on the rock shaft 138. Rigid with the gears 142 are gears 143 meshing with the teeth of a segmental rack 144 formed on a yoke 145, the side arms of which are pivoted on the rod 141. Rotatably mounted between the side arms of the yokes 145 are pinions 146 and 147. These two pinions are constantly in mesh so that rotation of one will effect equal rotation of the other in the opposite direction. Pinion 146 is in engagement with the totalizer actuating gear 134, while pinion 147 is in engagement with the teeth of a transfer segment 151 journaled on the rod 141 and having a downwardly extending portion carrying a shoulder 152 (Fig. 8) normally resting against a collar on the rock shaft 138, thereby preventing anti-clockwise movement of the segment 151 from the position in which it is shown in the figure last mentioned. By tracing the movement through, it will be seen that as the higher order slides 1 are drawn forward in the direction of the arrows (Figs. 8 and 9) the yoke 145 will be swung forward and that because of the opposition afforded by the transfer segment 151, this will cause rotation of the actuating gears 134 to extents corresponding to the adjustment of the slides 1.

When any of the totalizer elements are carried past the transfer position they will trip the transfers so that the higher order wheels will be advanced a step when the driving mechanism is operated. If, however, the amount set up should, through error, be too large the slides 1 may be reversely adjusted to make the correction at any time before the driving mechanism is operated. This correcting movement will, if it carries the totalizer element backward through the transfer position, restore the transfer devices to normal so that no transfer will be turned in during the subsequent operation of the machine. The transfer mechanism comprises a pair of plates 153 and 154 for each totalizer element except the highest order element, these plates being fastened together so as to form a unit. These units are loosely mounted on a supporting rod 155 fast at its ends in the frame members 133 (Fig. 1). The plate 153 has two locking faces to engage the locking ring 126. As any of the totalizer elements passes counterclockwise (Fig. 8) or clockwise as viewed in Fig. 9 through the transfer position, its transfer tooth 125 will enter a notch 157 in the plate 154 and rock the plates 153 and 154 to the position shown in Fig. 10, this movement being permitted by the cut 127 in the locking ring 126. A forwardly extending arm of the plate 153 carries a pin 158 normally in engagement with a notch in the rear end of a transfer member 161. This member 161 has shoulders 162 on its forward edge to engage a stud 163 attached to the side of the transfer segment 151. In its untripped position the upper shoulder 162 of the member 161 engages the stud 163 and prevents accidental displacement of the transfer segment, but when the transfer is tripped or moved to the position shown in Fig. 10, the lower shoulder 162 is brought into engagement with the stud.

Fastened to the rock shaft 138 is a set of cams 165, one for each of the elements 161. These cams are in the form of segments of different lengths so that when the shaft 138 is rocked the elements 161 will be operated successively from lower to higher orders. Each of the transfer members 161 is provided with a downwardly extending portion 166 which is normally out of the path of the associated cam 165, but when the transfers are tripped and the elements 161 moved to the position shown in Fig. 10, the downwardly extending portions of the elements will be carried into the paths of their cams 165. Then when the shaft 138 is rocked the projections 166 will be engaged by the cams and the elements 161 moved to the position shown in Fig. 11, thereby, through engagement with the studs 163, positively rotating the transfer segments 151 a single step clockwise (Figs. 8 and 11). This movement of the transfer segments is transmitted through the pinions 157 and 146 to the actuators 134 so as to turn the actuators and totalizer elements one step in the adding direction. The cams 165 are arranged to hold the members 161 and the transfer segments in the position shown in Fig. 11 until the sub-totalizer is swung out of engagement with the actuators and the locking plates 154, after which the shaft 138 is rocked in the reverse direction. The forepart of this reverse movement of the shaft carries the transfer cams 165 out of engagement with the projections 166, while at near the end of the reverse movement arms 167 rigid with their respective transfer cams 165 will engage the extensions 166 and restore the elements 161, the transfer segments 151, and the plates 153 and 154 to normal condition. The totalizer is then moved back into engagement and the rock shaft 138 turned forward again to carry the arms 167 out of the path of the projections 166 far enough to permit tripping the elements 161 during the next operation of the amount slides.

The mechanism for rocking the shaft 138 comprises a gear segment 171 (Fig. 16) fast to a rock shaft 172 journaled at one end in the right hand plate 133 and at the other end in a similar plate 173 (Fig. 1). The teeth of the gear segment mesh with the teeth of a pinion 174 (Fig. 16) fast to the right hand end of the rock shaft 138. Fastened to the shaft 172 is a bell crank 175 (Fig. 15) having oppositely extending antifriction rollers 176 and 177 riding upon the peripheries of cams 178 and 179 respectively. These cams are secured to the driving shaft 31 and are so arranged that as the shaft is turned the bell crank 175 will be rocked first clockwise and then counterclockwise. It will then be seen that this movement of the bell crank 175 will rock the shaft 138, first to carry the transfer cams 165 into engagement with the transfer plates 161, and then back out of engagement. The portion 183 of the cam 178 carries the bell crank 175 far enough in the anti-clockwise direction for the arms 167 to restore the transfer mechanism to normal, after which the bell crank is rocked clockwise again a short distance to move the arms 167 out of the way of the elements 161. This latter movement is imparted by a cam 184 on the periphery of a disk 185 fastened to the driving shaft $3^1$ riding under an antifriction roller 186 attached to the side of a downwardly extending portion 187 of the bell crank 175.

The sub-totalizer is moved in and out of engagement with the actuators and transfer elements by rocking the totalizer yoke frame 131 about its pivots 132. For this purpose a notch 191 (Fig. 1) in an extension of the right hand side arm of the yoke 131 engages a pin 192 extending through an opening 193 (Figs. 15 and 16) in the frame plate 133, said pin being fastened to the side of a bell crank 194 pivoted at 195 to the frame member 133. This bell crank is normally held in the position shown in Figs. 15 and 16 by a latching plate 196, pivoted at 197 to the machine frame and having a notch 198 engaging a shoulder 199 on the upwardly extending arm of the bell crank 194. A spring 201 stretched between the plate 196 and a fixed pin (not shown) tends at all times to draw the plate down into latching position. Shortly after the driving shaft 31 begins its rotation a stud 202 attached to the side of the disk 185 will strike the arm 203 formed on the plate 196 and raise the plate to disengage its notch 198 from the shoulder 199. At the same time a cam on the side of the disk 185 will have been turned far enough for its portion 204 to engage an anti-friction roller 205 attached to the side of the bell crank 194 and swing the bell crank clockwise (Figs. 15 and 16) until a second anti-friction roller 206 on the bell crank strikes a stub-cam 207 fast to the shaft 98. This shaft, it will be recalled, is turned only in clearing operations so the cam 207 is normally in position to limit the movement of the bell crank 195. As the bell crank is rocked as just described the pin 192 will swing the totalizer frame 131 far enough about its pivots 132 to disengage the gears 123 from the actuating gears 134. The locking ring 126 will also, of course, be carried out of engagement with the transfer locking plate 153. As the cam disk continues its movement a cam groove 211 (Fig. 16) will be carried into engagement with the roller 205, and at near the end of the rotation of the driving shaft the portion 212 of the groove will restore the subtotalizer to normal position, that is, the position where the notch 198 in the latch plate 196 will reëngage the shoulder 199. Ordinarily the action of the spring 201 is sufficient to engage the notch with the shoulder, but in order to make proper latching absolutely certain, there is provided a bell crank pivoted on the shaft 172 and having a rearwardly extending arm 213 (Fig. 15) which is struck by the stud 202 at near the end of the rotation of the disk 185. This rocks the bell crank clockwise (Fig. 16) to carry its other arm 214 against the arm 203 of the latching plate 196 and force the latching plate down firmly into engagement with the bell crank 194.

In total taking or clearing operations the shaft 98 is turned, thereby carrying the cam 207 out of the path of the roller 206 and allowing the sub-totalizer frame 131 to rock still farther so as to engage the adding gears 123 with the gear 137 meshing with the teeth on the units amount slide and with the gears 142 meshing with higher order amount racks.

Means are provided for locking the totalizer elements against rotation except when they are in engagement either with the actuating gears 134 or the gears 137 and 142. For this purpose there is provided a locking device consisting of side arms 221, pivoted as at 222 to the side arms of the sub-totalizer yoke 131, and a transverse plate 223 extending across the gears 123. Attached to the right hand side arm of this locking device is a pin 224 projecting through a slot in the adjacent frame plate 133. When the parts are in their normal condition the pin 224 rests in the upper portion 225 (Fig. 16) of the slot, in which position the edge of the transverse plate 223 is out of engagement with the teeth of the gears 123. The first movement of the subtotalizer frame 131 to carry the gears 123 out of engagement with the actuators 134 will move the pin 224 into the intermediate portion 226 of the slot, thereby swinging the plate 223 into engagement with the gears 123. The portion 226 of the slot is concentric to the pivots 132 of the sub-totalizer frame, so the gears 123 will be held as long as the pin 224 is in this portion of the slot. If the totalizer is swung downward the full distance to engage the gears 123 with the gears 137 and gears 142 for clearing, the pin 224 will enter the portion 227 at the bottom of the slot, thereby drawing the plate 223 out of engagement and freeing the gears 123 for rotation. When the frame 131 is rocked back to the normal or adding position, the locking plate 223 will, of course, be again engaged with the gears 123 to prevent them from turning until they are again reëngaged with the actuating gears 134.

The grand totalizer.

The grand totalizer is carried in a yoke-shaped frame 231 similar to the frame 131 for the sub-totalizer. The side arms of the frame 231 are fastened to a rock shaft 222 journaled in the supporting or frame plates 133. Fastened to the left end of the shaft 232 is a bell crank 253 (Fig. 17) the arms of which carry oppositely extending rollers 234 and 235 coöperating respectively with cams 236 and 237 fastened to the shaft 98. The shape and relative arrangement of the cams is such that when the shaft 98 is turned in the direction of the arrow the shaft 232 will immediately be rocked counter-clockwise, Fig. 17, or clockwise, as viewed in Figs. 2 and 8, to carry the gears 238 of the grand totalizer into engagement with the actuator gears 123. The gears 123 of the sub-totalizer are then swung out of engagement with the actuators 134 and into engagement with the gears 137 and 142. The adding elements of the grand totalizer are the same in construction as those of the sub-totalizer and as the gears 238 move into engagement with the actuators 134, locking rings and single toothed transfer disks are carried into engagement with the upper portions of the plates 153 and 154. Said upper portions are provided with notches 239 to be engaged in by the transfer teeth 240, the arrangement being such that the transfers are tripped in the same direction and in exactly the same way as already described in connection with the sub-totalizer. The transfers are also turned in in exactly the same way by a transfer movement of the actuators imparted through the transfer segments 151 by the invariably moved cams 165. The grand totalizer is arranged to take care of one more denomination than the sub-totalizer, that is, the capacity of the former is $999,999. There is, however, no transfer segment 151 and planetary gearing intermediate the highest and next to highest denominational elements, but transfers from one to the other are effected by a pinion 241 (Fig. 8) pivoted to the side plate of the grand totalizer frame 231 and operated on the well known Geneva stop principle.

In order to prevent rotation of the grand totalizer elements except when they are in engagement with the actuating gears 134, there is provided a locking yoke comprising a transverse plate 242 (Figs. 2 and 8), normally engaging the gears 238 of the grand totalizer, and held by side arms 243 pivoted as at 244 to the side plates of the grand totalizer frame. The left hand side arm 243 of the locking yoke has an extension 245 carrying an anti-friction roller 246 projecting laterally into a curved slot 247 in the adjacent frame plate 133. The arrangement is such that as the grand totalizer is rocked to engage its gears 238 with the actuators 134 the locking plate 242 will be withdrawn from engagement with the gears and returned to engagement as the totalizer is rocked back to its normal position.

Total taking mechanism.

As hereinbefore stated, the sub-totalizer may be cleared at the end of the day or any other desired period of time and the sub-total printed. It has also been brought out in a general way that the amount taken from the sub-totalizer is entered on the grand totalizer and that operation of both manually operated resetting devices and the driving mechanism is required to accomplish these various things and restore the parts to their normal condition. The various features of construction whereby these results are accomplished will next be described.

Figure 29:
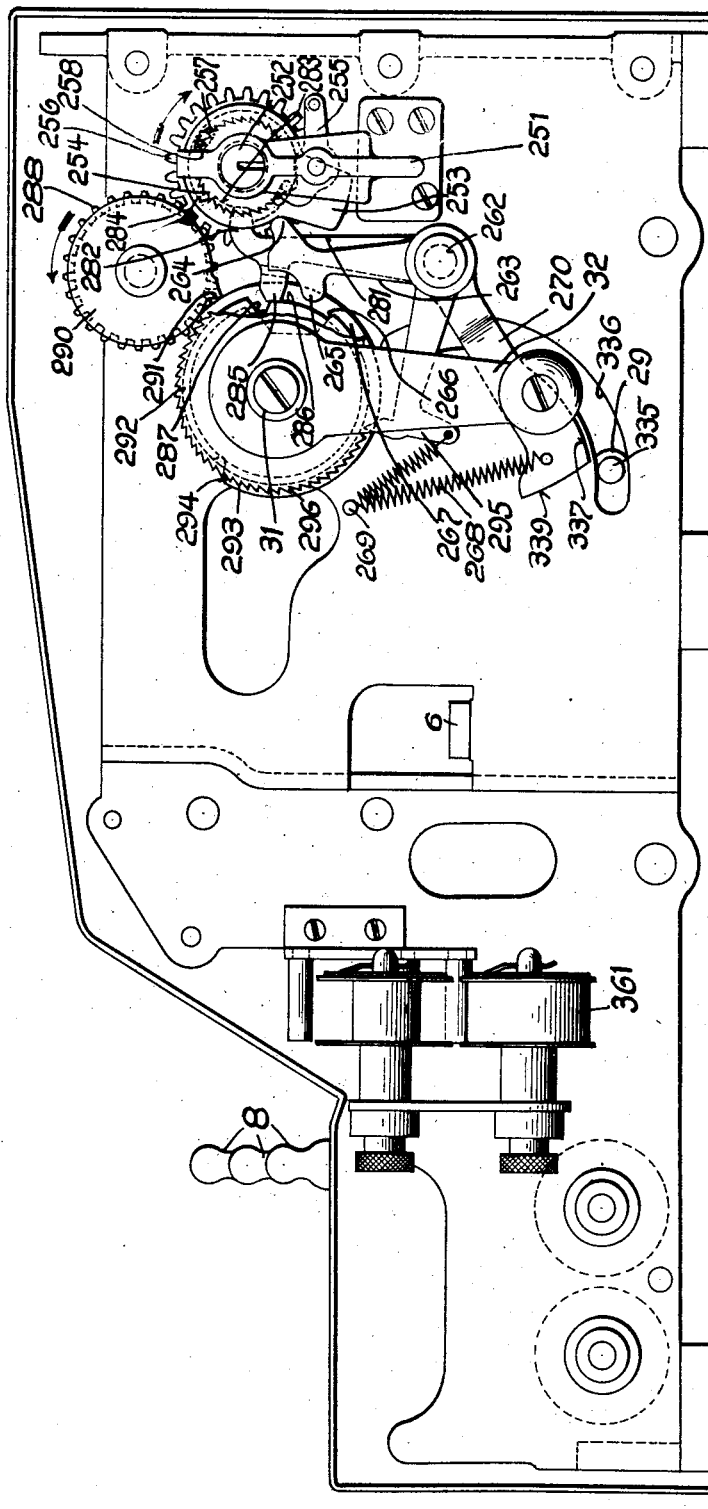
Fig. 29 shows in right elevation certain features of the total taking mechanism.

Mounted in a bracket 251 (Fig. 29) attached to the right hand side frame is a lock of the plunger type having its barrel 252 in axial alinement with the shaft 98. Fastened to the lock barrel is a cam 253 and a ratchet 254, the teeth of the latter coöperating with a spring operated pawl 255 to prevent rotation of the lock barrel in one direction. Attached to the end of the shaft 98 adjacent the lock barrel 252 is a gear 256. This gear is provided with slots 257 into which project pins 258 fastened to the cam 253. (See also Fig. 34). The slots 257 are long enough to permit rotation of the lock barrel 252 and cam 253 approximately 40° before the position of the shaft 98 will be affected, the shaft and lock barrel then turning as a unit during the last 320° of motion of the latter. Pivoted on a stub shaft 262 is an arm 263 having a projection 264 resting against the periphery of the cam 253. The 40° movement of the lock barrel and cam will swing the arm 263 far enough to carry the portion 265 thereof into engagement with the edge 266 of a cut in the periphery of a disk 267 attached to the driving shaft 31 and then move the disk far enough to turn the driving shaft approximately 15°. The arm 263 is held in engaged position by the cam 253 for a short time after the lock barrel 253 and shaft 98 begin their unitary movement. The arm 263 is then rocked back to its original position by the action of a spring 268 stretched between a fixed pin 269 and an arm 270 rigid with the arm 263. The arm 270 also has another purpose which will be described later. Loosely mounted on the stub-shaft 262 is a second arm 281 having a projection 282 engaging a cut 283 in the periphery of a disk 284 fastened to the shaft 98. A second projection 285 on the arm normally rests against the periphery of a disk 286 secured to the driving shaft 31. The 15° movement imparted to the driving shaft by the arm 263 will bring a cut 287 in position to receive the projection 285. At the beginning of the movement of the shaft 98 the cut 283 will be carried from under the projection 282, the result being that the projection 285 is engaged with the cut 287. It is held in engagement by the periphery of the disk 284, thereby locking the shaft 31, until the shaft 98 completes its 320° movement, at which time the cut 283 will be brought to a position where the lever 281 will be freed so as to permit turning the operating handle 32 and driving shaft 31. The reason for turning the shaft 15° before locking it will appear later.

Meshing with the teeth of the gear 256 is a gear 288 journaled on a stub-shaft 289 fast to the machine frame. Rigid with the gear 288 is a disk 290 on the periphery of which is formed a tooth 291. When the lock barrel has been turned a complete rotation and the shaft 98 its first eight-ninths of a rotation or 320°, the disk 290 will have been turned far enough to engage the tooth 291 with the cut out portion 292 of a disk 293 secured to the driving shaft 31, thereby bringing the shaft 98 to a stop. The operating handle 32 is then turned to complete its rotation during which a notch 294 in the cam 293 will engage the tooth 291 and turn the gears 288 and 256 40° so as to complete the rotation of the shaft 98. A spring operated alining pawl 295 coöperates with the teeth of a ratchet 296 fastened to the driving shaft 31 to prevent backward rotation of the operating handle and shaft.

At the beginning of the eight-ninths rotation of the shaft 98 the grand totalizer is swung into engagement with the actuators 134 by the cams 236 and 237 previously mentioned. At the same time the sub-totalizer is unlatched and swung into engagement with the gears meshing directly with the amount racks 1. For the purpose of unlatching the sub-totalizer the shaft 98 has attached thereto a cam 300 (Fig. 15) on the side of which is a stud 301 normally contacting a shoulder 302 on the lower edge of the latching plate 196. As soon as the shaft 98 begins to move, the movement being in the direction of the arrow, the latch plate 196 is swung up to disengage its notch 198 from the shoulder 199 on the bell crank 194. The portion 303 of the cam 300 then contacts an anti-friction roller 304 on the rearwardly extending arm of the counter engaging bell crank 194 and starts to swing the bell crank about its pivot. At the same time the stub-cam 207 is carried out of the path of the roller 206 so that further movement of the cam 300 can swing the subtotalizer all of the way down to engage its gears 123 with the gear 137 for the units amount slide and the gears 142 for the higher order slides. As the shaft 98 nears the end of its 320° movement the stub-cam 207 will engage the roller 206 and swing the sub-totalizer far enough toward normal position to disengage its gears 123 from the gears 139 and 142. When the shaft 98 is given its final 40° movement the stub cam 207 will carry the sub-totalizer far enough for the roller 205 to be engaged by the cam groove 211 when the driving mechanism is operated, thereby returning the sub-totalizer to its normal adding position. The grand totalizer remains in engagment with the actuators 134 throughout the entire 320° movement of the shaft 98 and a part of the final movement of the operating handle and driving shaft 31, disengagement being effected by the cam 236 at the end of the final 40° movement of the shaft 98.

After the grand totalizer is moved into engagement with the actuators and the sub-totalizer into engagement with the lower gears the sub-totalizer is turned back to zero. This effects forward movement of the amount racks 1 in the same way as though they were manually adjusted and the movement is transmitted through the yokes 145, pinions 146 and 147 to the actuators 134 thereby differentially rotating the adding elements of the grand totalizer. As the grand totalizer elements are turned, any of their transfer teeth 240 passing the transfer position will trip the elements 161 so that when the driving mechanism is operated the transfer segments and pinions 146 and 147 will be operated to turn the actuators 134 and adding elements of the grand totalizer an additional step.

For the purpose of resetting the sub-totalizer the shaft 128 on which the adding elements are rotatably mounted is provided with a groove 305 in which rests a spline 306. The adding elements are provided with internal teeth 307 (Fig. 8) projecting into peripheral grooves 308 in the shaft 128. These teeth are to be engaged by the spline 306 during clearing operations, but the spline normally rests in such a position that it does not interfere with rotation of the adding elements during adding operations. The spline 306 is provided with portions 309 and 310 at its opposite ends, these portions extending through openings 311 (Fig. 16) in the plates 133, the arrangement being such that as the sub-totalizer is lowered to clearing position the portions 309 and 310 will engage the lower edges of the openings 311 in such a way that the spline 306 will be held stationary during the final movement of the sub-totalizer frame so that the outer edge of the spline will be in position to engage the resetting teeth 307.

As the sub-totalizer is lowered the portion 309 at the left end of the spline will enter a slot 312 (Figs. 12 and 17) in an element 313 fastened to a short shaft 314. This shaft is journaled in a boss 315 extending upwardly from a plate 316 supported by rods 317 secured in the frame of the machine. Fastened to the shaft 314 is a mutilated gear 318. Coöperating with the gear 318 is a mutilated gear 319 fastened to the shaft 98. The arrangement of the teeth on the gears 318 and 319 is such that after the grand totalizer and sub-totalizer have been swung to the total taking position the shaft 314 will be given a complete rotation, this rotation being completed before the shaft 98 has finished its 320° movement. Owing to the shape of the slot 312 the first one-tenth of a rotation of the shaft 314 will not turn the spline 306 and shaft 128, but during the last nine-tenths of movement of the shaft 314 the spline and shaft 128 will be turned and the teeth 307 of any adding elements that have been advanced from the zero position will be engaged by the spline and carried back to zero. The sub-totalizer is then moved up toward its normal adding position thereby allowing the spline to drop back into the slot 305. This, it is clear, leaves the shaft 128 one-tenth of a step short of a complete rotation. Devices actuated by the driving mechanism then engage the spline and carry it and the shaft the rest of the way to the normal position.

The mechanism for giving the shaft 128 and the spline 306 the final movement is shown in Fig. 15. It comprises a bell crank 321 pivoted at 195 and having an arm 322 suitably formed to project through an opening in the bell crank 194 and far enough into the opening 311 to engage the portion 310 of the spline 306. The other arm 323 of the bell crank is held against the periphery of a cam 324 by a spring 325. The cam 324 is fastened to the driving shaft 31 and is so shaped that the first fifteen degrees of movement of the driving shaft will operate the bell crank 323 to adjust the spline 306 and shaft 128 to correct starting position. After a total taking operation of the shaft 98 and driving shaft 31 the spline 306 will be left one-tenth of a rotation short of its normal position but this one-tenth movement will be imparted by the bell crank 321 at the beginning of the first certificate issuing operation after the total is taken.

In order to hold the sub-totalizer shaft 128 and the spline 306 against endwise movement, there is provided a plate 326 (Figs. 12 and 36) having a slot 327 engaging with a peripheral groove 328 in the shaft and with notches 329 and 330 (Fig. 14) in the spline. The arrangement is such that regardless of the angular position of the shaft 128 some portion of the slot 327 will be in engagement with the notches in the spline.

During all the time that the sub-totalizer shaft is being carried from its lower or clearing position back to its normal or adding position, the shaft 128 is locked against rotative movement so as to prevent rotative displacement of the shaft 128 and the resetting spline. This is done by the locking plate 223. It will be remembered that as the adding gears 123 are withdrawn from engagement with the lower gears the plate 223 is moved into engagement with said gears and remains in engagement until the gears are reëngaged with the actuators 134. When the plate 223 is moved to locking position at the beginning of the upward movement of the sub-totalizer, its edge will engage a notch 331 in the edge of a disk 332 fastened to the shaft 128 and remain in engagement until the upward movement is completed. The diameter of the disk is the same as that of the gears 123. After the subtotalizer is back in adding position the spline 306 is then given the final step of movement by the bell crank arm 322, thereby bringing the notch 333 in the periphery of the disk 332 in position to receive the locking plate 223 when the sub-totalizer is again moved out of engagement with the actuating gears.

When describing the arm 270 it was stated that it performed another function beside serving simply as a spring arm to hold the arm 263 against the cam 253. This function is to prevent turning the lock barrel 252 unless all of the amount slides are at zero position, although it also prevents adjustment of the amount slides after rotation of the lock barrel 252 has been started, until the barrel has been turned far enough to lock the driving mechanism against operation. Coöperating with the arm 270 is a pin 335 (Figs. 3 and 29) attached to the side of the element 29 and projecting laterally through a slot 336 concentric to the stub shaft 30 on which the element 29 is pivoted. When the element is rotated counter-clockwise by movement of any of the manually adjustable slides away from zero, the pin 335 is carried under the curved portion 337 of the lower edge of the arm 270, thereby preventing downward movement of the arm and making it impossible to turn the lock barrel 252 and cam 253. If, on the other hand, the lock barrel has been turned far enough to render the cam 253 effective, the arm 270 will have been swung down far enough to bring its end 339 in the path of the pin 335 so that it will be impossible to draw any of the manually operable slides forward from their zero position; but as the cam 253 is turned far enough to free the arm 263 and arm 270, the latter will be raised by its spring 268 so as to permit movement of the amount slides when the sub-totalizer is cleared.

The movement of the sub-totalizer frame 131 to carry the totalizer from adding to clearing position sets a type carrier to print on the record strip a character designating the total. This character, which in the present instance is a "T", is carried on a slide 341 supported for endwise movement only by the transverse bars 6. At its rear end the slide 341 (Figs. 7 and 26) carries a stud 342. Rigid with the left hand side plate of the sub-totalizer yoke 131 are arms 343 and 344 (Fig. 2), the latter being normally in engagement with the stud 342. When the yoke or frame 131 is swung to its lowest position, the arm 343 will contact the stud 342 and move the slide 341 forward a step so as to bring the "T" to the printing line and when the frame 131 is swung back to adding position the arm 344 will engage the stud 342 and restore the slide 341 to its normal ineffective position.

*Record strip mechanism.*

The record strip is wide enough to extend across all of the slides so as to take an impression of the same set of data as is printed on the certificates as they are issued. It also receives an impression of the total set up on the amount slides in clearing operations so as to show the total value of the certificates issued. The strip is designated in the various figures by the numeral 345. The supply roll 346 is carried by a rod 347 having its ends engaging slots 348 in a supporting frame 349 held by rods 350 fastened to the machine frames. As the paper is drawn from the supply roll 346 the rod gradually moves down toward the bottom of the slot. The record strip passes from the supply roll over a rod 351 supported by the side plates of the frame 349 under a rod 352 held at its ends in the side arms 353 of a yoke 354 carrying the platen 355. From the rod 352 the strip passes under the platen 355 and a rod 356 supported in the platen yoke or frame up over a roller 357 attached to the side of a lever 358, then under a rod 359 held by the side frames of the machine and up to a storage roller 360.

Impressions are taken from the record strip type carriers by swinging the platen 355 down to press the record strip against an ink ribbon 361 which is fed back and forth across the type carriers. The mechanism for feeding the ribbon and reversing it is not shown or described herein, as it forms no part of the present invention. Any of several well known mechanisms of the kind may be employed for the purpose.

The platen frame, which as before stated, is in the form of a yoke comprising side arms 353 and a transverse bar 354 is loosely mounted on a shaft 365. Loosely mounted on the same shaft is a second yoke comprising side arms 366 connected by a transverse bar 367. Mounted in the transverse bar 354 of the first yoke are set screws 368 the ends of which contact the transverse bar 367 of the second yoke. The side arms of the first yoke carry clamp screws 369 extending through elongated slots 370 in the side arms of the yoke 367. These clamp screws and the set screws 368 provide a means whereby the yoke 354 may be adjusted relative to the yoke 367 and held in adjusted position by first loosening clamp screws and adjusting the set screws to get the proper impression and then tightening the clamp screws to prevent any change in the adjustment.

Rigid with the right side arm 366 of the second yoke is an arm 375 (Figs. 3 and 30) carrying at its rear end an anti-friction roller 376 projecting into a cam groove 377 in the left hand side of a disk 378 fastened to the driving shaft 31. The configuration of the cam groove 377 is such that shortly after the shaft begins to turn the platen 355 will be rocked down to take an impression from the type carriers and then restored to its normal or raised position.

Figure 31:
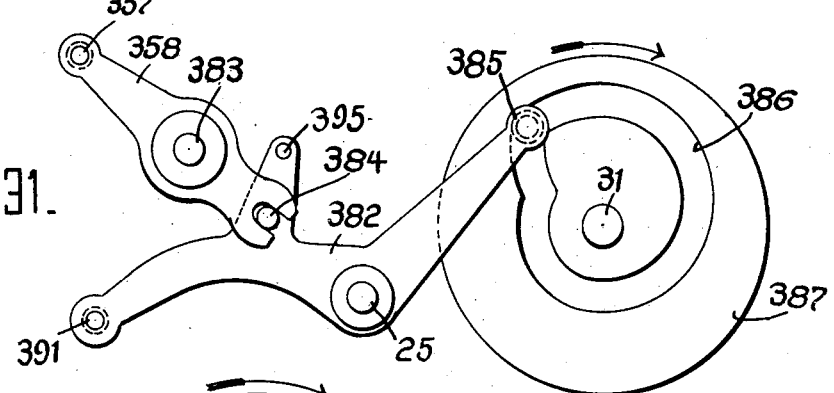
Fig. 31 is a detail of a cam and levers operated thereby for moving the record strip into position to receive impressions at the printing lever and then carrying it back to a point where the printing may be seen through an opening in the casing of the machine.

As shown in Fig. 1 the last few impressions on the record strip are visible through a window 381 in the front of the casing. It is, of course, apparent that some means must be provided for moving the paper so as to bring the printing on the proper line and then moving it back so as to expose the impression to view. The mechanism for doing this comprises a bell crank 382 journaled on the rod 25, and the lever 359 (Figs. 3 and 31). The latter is pivoted on a rod 383 supporting a storage roller 360. The rearwardly extending arm of the bell crank carries an anti-friction roller 385 projecting into a cam groove 386 formed in the side of a disk 387 fastened to the driving shaft 31. The forward end of the bell crank has a roller 391 projecting laterally under the record strip in the same way as already described when referring to the roller 357. The shape of the cam groove 386 is such that at the beginning of the rotation of the driving shaft 31 the bell crank 382 will be swung clockwise and the lever 358 counter-clockwise. This will lower the roller 357 and at the same time raise the roller 391. The rod 352 and the platen 355 coöperate with the roller 391 in such a way that as the roller moves up into the slots 392 in the platen frames the paper will be drawn backward around the platen 355 so as to bring the proper line thereon in position to receive the impression. After the impression is taken, the paper is held in this position for a short time. The cam groove 386 then restores all of the parts to their first position, thereby drawing the paper forward again to bring the item just printed in position to be seen.

As the paper is being moved forward as just described, the storage roller 360 is rotated a step to effect line spacing. With this end in view the storage roller has fastened thereto a ratchet wheel 393. Coöperating with the teeth of the ratchet wheel is a pawl 394 pivoted at 395 to an upwardly extending portion of the bell crank 382. When the bell crank is rocked anti-clockwise to its original position the ratchet wheel and storage roller will be advanced. The pawl 394 is held in engagement with the teeth of the ratchet wheel 393 by a spring 396 stretched between a pin on said pawl and a similar pin on a pawl 398. The pawl 398 is to prevent reverse rotation of the storage roller 360.

Zero eliminating mechanism.

In printing items and totals on the record strip no zeros are printed to the left of significant figures representing amounts. They are, however, printed to the right of significant figures so as to correctly show the value of different items and totals. The mechanism whereby this result is obtained comprises a series of small levers 401 (Figs. 1, 22, 23, 24, and 27), pivoted to the left hand sides of the ten dollar, hundred dollar, and thousand dollar slides. At their rear ends said levers carry type to print the zeros, but the levers are normally in such position that their type will not be engaged by the record strip platen 355 when the platen is operated. At their forward ends the levers are provided with lugs 404 projecting above pins 405 of the lower order levers. The highest denomination rack, that is, the tens of thousands slide, shown in Fig. 25, and all of the lower order slides, except the one for units of dollars, are provided with cam plates 406 having beveled portions 407 and coöperating with correspondingly shaped portions 408 at the rear of the levers. It is clear that as any amount slide moves forward its beveled portion 407 will engage the portion 408 of the next lower order lever and cam the lever up to bring its zero type to the printing line. This movement, because of the coöperation of the lugs 404 with the pins 405, will rock the other lower order levers so that their zeros will also be in position to print. It is clear, of course, that the levers for higher order slides will not be disturbed by forward movement of slides of lower order.

As previously stated, the totals are not printed on the certificates, although the construction can obviously be changed so as to print the total upon an inserted slip if desired. Owing to the fact that savings certificates are not issued for over one hundred dollars, the hundred dollar slide is, in the present machine, not equipped with type to print anything over one hundred dollars. The type on said slide are, however, arranged to serve as a zero eliminating device, this being effected by having a forward printing face 411 (Figs. 23 and 27) arranged to print the dollar mark, while at its second position 412 the type carrier is of double width and carries characters to print the dollar mark and the digit "1". It is clear that by this arrangement of the type faces, if for example a certificate is issued for fifty dollars the amount would be properly printed as "$50", while if a certificate is issued for one hundred dollars, the amount would be properly printed as "$100".

Perforating mechanism.

The perforating mechanism employed is devised with the idea of using a minimum number of punches in connection with punch controlling and operating mechanism suitable for use in cash registers and similar machines. With this in view, four groups of movable punches and one group of stationary punches are employed, in connection with rotatable elements each carrying a plurality of faces with holes arranged to receive the non-perforating punches, thereby permitting idle movement of all punches which are not necessary to perforate the characters desired. The paper is moved against the punches so that the non-perforating punches which are held stationary by the faces of the rotatable elements are forced through the paper. This provides a means whereby the punches are selectively operated under the control of elements rotatable in the same way as the ordinary type wheels while the movement of the paper against the punches permits rotating the controlling elements about a fixed center instead of, as in prior devices known to the applicant, the pins and controlling elements both being moved toward the paper to effect perforation.

The grouping of the pins is indicated by the arrangement of the holes through which the pins operate, as shown in Figs. 19 and 21. Two groups of thirty-five pins each are employed, the pins being arranged in rectangular form as indicated by the holes 415 and 416. Two other groups of pins are arranged in the outline of a dollar mark as indicated by the holes 417 and 418. As will appear later, pins in group 417 are operated to perforate either the dollar mark or the digit "1", in the latter event the pins in group 418 being operated to perforate the dollar mark. The digit 1 and the dollar mark are both perforated only when a certificate for $100 is issued.

Fastened to the certificate printing platen frame 108 is a plate 421. Rigid with this plate is a second plate 422 shaped in such a way as to form a slot 423 to receive the inserted certificate. Fastened to the upper side of the plate is a yoke-shaped bracket 424, the rear arm of which is narrower than the front arm and extends through a hole (not shown) in a plate 425 fastened to the under side of the frame 316 hereinbefore mentioned. The movable perforating pins or punches 426 are loosely mounted in the plate 425 and are provided with collars 427 engaging the top of the plate so as to limit their downward movement. The lower ends of the pins rest in the holes 415, 416, 417, and 418 in the plate 422, while the upper ends engage the corresponding holes in the top portion 428 of the yoke or bracket 424. It is apparent that if paper is inserted in the slot 423 and the platen frame 108 moved upward, the punches 426 will remain stationary for the first part of the movement and will then be engaged by the paper and carried upward through the plate 425 and that by stopping the movement of the proper punches, while permitting continued movement of the others, the punches may be caused to perforate desired characters during the final movement of the paper.

The devices for controlling the punches consist of three elements loosely mounted on the left end of the rock shaft 138. The units element 431 and the tens element 432 (Fig. 1) each has on its periphery ten blocks 433 with holes therein arranged as shown at 434 (Fig. 18) to receive the non-perforating punches. The solid portions of the faces of the blocks will stop the pins which are to perforate, so that at near the end of the upward movement of the platen frame the lower ends of the perforating punches will be forced through the paper into the holes 435 in the plate 421 under the inserted paper. The third rotatable element, which is designated by the numeral 436, is to perforate either the dollar mark alone or the dollar mark and the digit one, the latter in case a hundred dollar certificate is issued. For this purpose the face 437 has holes to receive only the punches of group 417 which are not needed in perforating the dollar mark, while the face 438 is wide enough to extend across the punches in both groups 417 and 418, the blank portion 439 operating all of the punches in group 418 to perforate the dollar mark and the other portion operating only those punches of group 417 necessary to perforate the digit "1."

The elements 431, 432, and 436 are connected by intermediate gearing with the three manually adjustable slides 1 so that movement of the slides to set up an amount will position the corresponding blocks 433 above the punches. The element 436 is fast to a sleeve 441 (Fig. 1) loosely mounted on the rock shaft 138. Fastened to the right end of the sleeve is a gear 442 meshing with a gear 443 attached to the end of a sleeve 444 loosely mounted on a shaft 445. Fastened to the sleeve 444 is a gear 446 meshing with the gear 142 coöperating with the hundred dollar slide 1. The units and tens elements 431 and 432 are loosely mounted on the sleeve 441. Attached to the left hand side of the units element is a gear 451 meshing with the teeth of a gear 452 fastened to a shaft 453. Secured to the shaft 453 is a gear 454 meshing with the teeth of the gear 137 coöperating with the units amount slide 1. The tens element 432 has attached thereto a gear 455 meshing with a gear 456 fastened to shaft 445, said shaft carrying at near its other end a gear 457 meshing with the teeth of the gear 142 for the tens of dollar slide. It is clear that adjustment of the amount slides to set up the amount for which a certificate is to be issued will cause corresponding rotation of the elements 431, 432, and 436 so as properly to control the selective operation of the perforating punches. As shown in Fig. 37, a character 461 is perforated at the right of the amount. It is not thought to be necessary to show the pins for perforating this character. They are simply stationary pins fastened to the under side of a forwardly extending portion 462 of the frame 316 with their lower ends operating through holes 463 in the plates 421 and 422.

The yoke or bracket 424 is provided with flanges 464, on the upper edges of which are alining teeth 465 to engage the gears attached to the side of the elements 431, 432 and 436 when the frame 108 is raised. The recesses between alternate teeth of the gears are deepened so as to make the alining action of the teeth as positive and exact as possible.

*Slide alining mechanism.*

Extending across all of the slides is a yoke 471, the side arms of which are fastened to the rock shaft 365. Loosely mounted on the rock shaft is a pawl 472 (Fig. 35) for each of the amount and depositors' number slides. These pawls are provided with a shoulder 473 whereby the pawls may be moved up out of engagement with the slides by movement of the yoke, as hereinafter explained. Springs 474 hold the points of the pawls in engagement with the alining teeth on the upper edges of the slides. Coöperating with the date and consecutive number slides are the pawls 101 which are the same as the pawls 472 except that they are not provided with shoulders 473. The reason for this is the pawls 101 are never withdrawn entirely from engagement with their slide. Spacing plates 476 are mounted on the shaft to hold the pawls in proper position on the shaft, the plates being shaped as at 477 to engage the yoke 471.

The first movement of the yoke 471 is downward, the movement being sufficient to lock all of the pawls into engagement with the alining teeth of their slides. The yoke is then rocked upward past its first position, thereby, through engagement with the shoulders 473, carrying the pawls 472 for the amount and depositors' number slides out of engagement with the alining teeth. The pawls 101 remain in engagement with the date and consecutive number slides, their springs being suitably arranged to permit this movement without becoming disengaged from the pawls, while the movement of the yoke is not great enough to carry the yoke entirely out of engagement with the shoulders 478 on the pawls.

Figure 30:
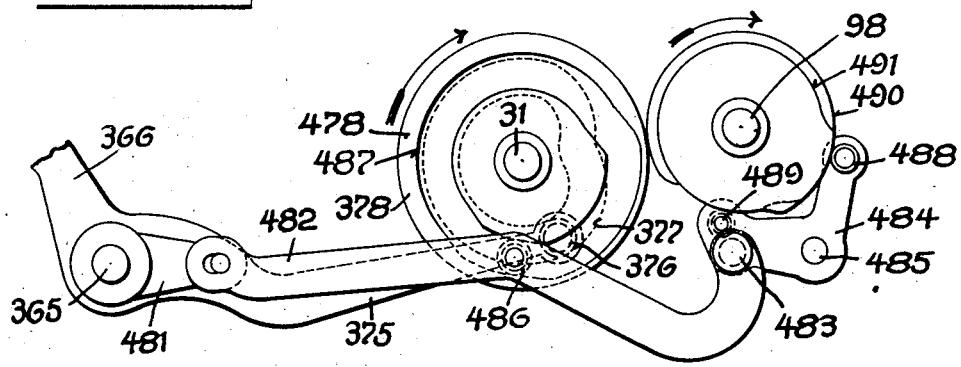
Fig. 30 is a detail of the cams and levers employed in operating slide alining mechanism and feeding the record strip.

The mechanism for rocking the shaft 365 and yoke 471 is shown in Figs. 3 and 30. Fastened to the shaft 365 is a short arm 481 having a slot and pin connection with a lever 482 pivotally connected at 483 with a bell crank 484 pivoted as at 485 to a boss on the rear frame of the machine. At a point intermediate its length the lever 482 is provided with an anti-friction roller 486 projecting into a cam groove 487 in the right hand side of the disk 378. The bell crank 484 is provided with oppositely extending anti-friction rollers 488 and 489 riding on the peripheries of cams 490 and 491 fastened to the shaft 98. The configuration of the cam groove 487 causes the lever 482 to be swung downward about the pivot 483 as soon as the driving shaft 31 begins to turn thereby rocking the shaft 365 and yoke 471 to lock the alining pawls in engagement with the alining teeth. They are held locked while the transfer devices are restored and are released by reverse movement of the lever 482 at about the same time that the impression is taken from the type carriers. The lever is then raised a slight additional distance with the result that the shaft 365 and yoke 471 are rocked back far enough to disengage the alining pawls from the amount and depositors' number slides to permit restoring the slides without the rattling noise which would result if the slides were restored with the pawls in engagement with the alining teeth. The final movement of the shaft 31 restores the alining pawls to normal position.

When the shaft 98 is turned in clearing operations, the 15 degree movement first imparted to the driving shaft 31 will lock the alining pawls in engagement with the alining teeth. Almost immediately after this, however, the cams 490 and 491 rock the bell crank 484 counter-clockwise (Fig. 30) thereby depressing the rear end of the lever 482. The roller 486 then serves as a fulcrum and the forward end of the lever is raised. This results in rocking the amount and depositors' number alining pawls out of engagement so as to permit adjustment of the amount slides under the control of the subtotalizer. At the end of the 320 degrees rotation of the shaft 98 the bell crank 484 will be rocked back in a clockwise direction, thereby again locking the slides against movement and holding them locked until the main driving mechanism has been turned far enough to print the total and restore any transfers which may have been tripped by the grand totalizer.

*Operation.*

In printing the certificate shown in Fig. 37, the blank was first inserted through the slot 100 in the left side of the casing in such a way that it rested between the ink ribbon 106 and the platens 107. The hundred dollar amount slide was then drawn forward one step by means of its handle 2 and the depositors' number handles 8 adjusted to set up the number of the account on the type carriers. Forward movement of the amount slide swung the yoke 145 forward and down about the transfer segment 151, thereby through the pinions 147 and 146, turning the actuator gear 134 and the hundreds of dollars adding element 123 of the sub-totalizer one division. This, if it carried the element through the transfer position, turned the transfer member 161 far enough to bring its arm 166 into the path of the corresponding transfer operating cam 165 and its lower lug 162 into engagement with the stud 163 on the transfer segment 151 for the thousands of dollars adding element. The hundreds punch controlling element 436 was also turned one division to bring its faces 438 and 439 above the groups of punches in the holes 417 and 418.

The driving shaft 31 was then turned a complete rotation by means of its handle 32. This raised the platen frame 108 to take an impression from the three sets of certificate printing type and carried the paper against the lower ends of the punches. Non-perforating punches were raised by contact with the paper into the holes provided for the purpose in the controlling elements 431, 432, and 436, while the punches necessary to perforate $100 were stopped by the solid portions of the elements. Continued upward movement of the frame 108 caused the ends of the perforating punches to penetrate the paper and enter the holes 431 in the paper supporting plate 421 attached to the platen frame 108. The record strip printing mechanism was operated at about the same time to take an impression from the upper sets of type 20 and the transfer cams 165 swung forward to engage the arm 166, if the arm was in lowered position, to turn the transfer segment 151, the pinions 147 and 146, the actuating gear 134 and the thousands adding elements 123 in one division. The sub-totalizer was then disengaged from the actuators 134 while the transfer mechanism and the slides 1 and 8 were restored to normal. The consecutive number slides were then operated to set up the consecutive number for the next operation, after which the subtotalizer was reëngaged with the actuators 134.

To print the total of $505 shown at the bottom of the record strip in Fig. 28, the key was inserted in the lock barrel 252 (Fig. 29) and turned a complete rotation. This, on account of the slot and pin connection 257, turned the shaft 98 three hundred and twenty degrees or until it was stopped by the tooth 291 engaging the periphery 292 of the disk 293 attached to the driving shaft 31. During the first forty degrees movement of the resetting key, the arms 263 and 281 were successively operated, first to turn the driving shaft 31 far enough to operate the bell crank 322 (Fig. 15) and thereby adjust the sub-totalizer resetting spline 306, and then to lock the shaft against further movement until the three hundred and twenty degree movement of the shaft 98 ended. At the beginning of the movement of the shaft the sub-totalizer was swung out of engagement with the actuators 134 and into engagement with the gears meshing directly with the racks on the slides 1, while the grand totalizer was swung into engagement with the actuators 134. The sub-totalizer was then turned back to zero by rotation of the shaft 128 and spline 306 through connections to the shaft 98, thereby setting up the tub-total on the slides 1, and, through the yokes 145, pinions 147, and 146, and the actuating gears 134, entering the sub-total on the grand totalizer. The consecutive numbering slides were also returned to their zero position by the yoke 94. Just at the end of this movement of the resetting key, the sub-totalizer was swung just far enough to disengage it from the lower gears.

The operating handle 32 was then turned a complete rotation. This, by engagement of the shoulder 294 on the disk 293 with the tooth 291 completed the rotation of the shaft 98 and connections, printed the total, restored any transfers tripped by the grand totalizer, moved the amount slides back to zero, swung the grand totalizer and the sub-totalizer back to their normal positions and advanced the units consecutive number slides a step ready to print correctly on the first certificate issued.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with a plurality of accounting slides having an accounting and a restoring movement, of means for operating the slides for accounting, and means controlled by the slides for positively restoring slides which have completed their accounting movement.

2. In a machine of the class described, the combination with a series of accounting slides arranged in denominational order and independently movable in one direction for accounting and in the opposite direction to restore them, of automatic mechanism for imparting accounting movements to the slides, and mechanism for positively restoring slides which have completed their accounting movement.

3. In a machine of the class described, the combination with a series of accounting slides arranged in denominational order and independently movable in one direction for accounting and in the opposite direction to restore them, of automatic mechanism for imparting positive accounting movements to the slides, and devices for positively restoring any slides which have completed their accounting movement.

4. In a machine of the class described, the combination with a series of accounting slides arranged in denominational order and independently movable in one direction for accounting and in the opposite direction to restore them, of mechanism for imparting accounting movements to the slides, and mechanism for positively restoring the units slide to one and the others to zero when they have completed their accounting movement.

5. In a machine of the class described, the combination with a series of accounting slides arranged in denominational order and independently movable in one direction for accounting and in the opposite direction to restore them, of mechanism for advancing the slides for accounting, mechanism for restoring the units slide to one and the others to zero when they have completed their accounting movements, and independent means for setting all of the slides at zero.

6. In a machine of the class described, the combination with a series of accounting slides arranged in denominational order and independently movable in one direction for accounting and in the opposite direction to restore them, of automatic mechanism for imparting accounting movements to the slides, a restoring device having an invariable extent of movement, and means whereby said device will restore the slides when they have completed their accounting movements.

7. In a machine of the class described, the combination with a series of accounting slides arranged in denominational order and independently movable in one direction for accounting and in the opposite direction to restore them, of automatic mechanism for advancing the slides for accounting, a restoring device having an invariable extent of movement, and means for establishing operative connection between the restoring device and any slides which have completed their accounting movement.

8. In a machine of the class described, the combination with a series of accounting slides arranged in denominational order and independently movable in one direction for accounting and in the opposite direction to restore them, of mechanism for advancing the slides for accounting, a restoring device having an invariable extent of movement, and means actuated by the restoring device for establishing a connection between the restoring device and any slides which have completed their accounting movement.

9. In a machine of the class described, the combination with a series of accounting slides movable in one direction for accounting and in the opposite direction to restore them, of means for advancing the slides in accounting operations, pawls pivoted to the slides, a restoring device constructed to receive said pawls, and means actuated by the restoring device for moving the pawls on any slides which have completed their accounting movement into engagement with said device whereby to effect restoration of the slides.

10. In a machine of the class described, the combination with a series of rectilinearly movable accounting slides arranged in denominational order, of means for actuating the slides and effecting transfers from lower to higher orders, and means for positively restoring any slides which have turned in transfers.

11. In a machine of the class described, the combination with a series of rectilinearly movable accounting slides arranged in denominational order, of means for actuating the slides and effecting transfers from lower to higher orders, and means for restoring the units slide to one and others to zero after transfers have been effected.

12. In a machine of the class described, the combination with a series of reciprocating slides having an accounting and a restoring stroke, of means for actuating the slides and effecting transfers in the accounting direction, a device having an invariable extent of movement, and means for latching to the invariably moved device the slides which have completed their accounting strokes whereby to effect restoration of said slides.

13. In a machine of the class described, the combination with a series of reciprocating slides having an accounting and a restoring stroke, of means for actuating the slides and effecting transfers in the accounting direction, a device having an invariable extent of movement, and means operated thereby for latching the slides which have completed the accounting stroke to the device whereby to effect restoration of said slides.

14. In a machine of the class described, the combination with a plurality of accounting slides arranged in denominational order and movable in one direction for accounting and in the opposite direction to restore them, of means for operating the slides for accounting, devices controlled by the slides for restoring slides which have completed their accounting movement, and mechanism controlled by the units slide for disabling the slide operating means during operations in which the slides are restored.

15. In a machine of the class described, the combination with a plurality of rectilinearly movable accounting slides having an accounting movement and a restoring movement, of invariably moved devices for actuating the slides in the accounting direction, an invariably moved restoring device, means for connecting any slides which have completed their accounting movement with the invariably moved restoring device, and means for rendering the aforesaid actuating devices ineffective when the connecting means is operated.

16. In a machine of the class described, the combination with a plurality of rectilinearly movable accounting slides having an accounting movement and a restoring movement, of invariably moved devices for actuating the accounting slides in the accounting direction, an invariably moved restoring device, a pawl carried by each slide operable when the slide has completed its accounting movement to connect the slide with the restoring device, and means controlled by the units pawl for rendering the aforesaid actuating devices ineffective during operations in which slides are restored.

17. In a machine of the class described, the combination with a plurality of rectilinearly movable accounting slides arranged in denominational order and having an accounting movement and a restoring movement, of invariably moved devices for actuating the slides in the accounting direction, an invariably moved restoring device, a pawl carried by each slide operable when the slide has completed its accounting movement to connect the slide with the restoring device, means actuated by the restoring device for operating the pawls, and means operated by the pawl on the units slide for rendering the aforesaid actuating devices ineffective during operations in which slides are restored.

18. In a machine of the class described, the combination with a plurality of accounting slides adjustable from a normal zero to ten other positions, means for adjusting the slides and effecting transfers as the slides pass from the tenth to the eleventh positions, and means for restoring higher order slides to zero and the units slide to one at the operation next following operations during which transfers are effected.

19. In a machine of the class described, the combination with a plurality of accounting slides each adjustable from a normal zero to ten other positions, of means for adjusting the slides and effecting transfers as the slides pass from the tenth to the eleventh positions, and means controlled by the slides for positively restoring higher order slides to zero and the units slide to one at the operation next following an operation during which transfers are effected.

20. In a machine of the class described, the combination with a plurality of accounting slides adjustable from a normal zero to ten other positions, means for advancing the slides and effecting transfers as the slides pass from the tenth to the eleventh positions, and means for positively restoring the higher order slides to zero and the units slides to one at the operation next following operations during which transfers are effected.

21. In a machine of the class described, the combination with a plurality of slides each carrying eleven digits 01234567890, of means for actuating the slides step by step from one zero to the other and transferring to the next higher order slide as a lower order slide passes from nine to the second zero, and means for restoring the higher order slides to the first zero and the units slide to 1 at the operation next following an operation during which transfers are effected.

22. In a machine of the class described, the combination with a driving mechanism, of manipulative devices differentially adjustable from a normal starting point, an element differentially moved by adjustment of the manipulative devices, means for moving the element a complementary distance at an operation of the driving mechanism whereby to complete an invariable extent of movement from normal, and means for then positively returning the element and thereby the manipulative devices directly to their normal starting points.

23. In a machine of the class described, the combination with a driving mechanism, of manipulative devices differentially adjustable from a normal starting point, an element moved by adjustment of the manipulative devices from a normal position to a position corresponding to that of the manipulative device given the greatest extent of movement, and means for moving the element a complementary distance at an operation of the driving mechanism whereby to complete an invariable extent of movement from normal, and means for then returning the element and thereby the manipulative devices directly to their normal starting points.

24. In a machine of the class described, the combination with totalizer actuators, of totalizer elements normally in engagement with the actuators, transfer segments, means normally holding the segments stationary, driving yokes each containing a pair of intermeshed pinions, one pinion of each pair meshing with a totalizer actuator and the other with a transfer segment, means for differentially rotating the driving yokes about the transfer segments and thereby differentially driving the actuators and totalizer elements, and means controlled by the totalizer elements for operating the transfer segments to give the actuators and totalizer elements an additional step of movement.

25. In a machine of the class described, the combination with totalizer actuators, of totalizer elements normally in engagement with the actuators, transfer segments, means normally holding the segments stationary, driving yokes each containing a pair of intermeshed pinions, one pinion of each pair meshing with a totalizer actuator and the other with a transfer segment, means for differentially rotating the driving yokes about the transfer segments and thereby differentially driving the actuators and totalizer elements, means controlled by the totalizer for positively actuating the transfer segments to give the actuators and totalizer elements an additional step of movement, and means for positively restoring the transfer segments.

26. In a machine of the class described, the combination with a totalizer, of actuators therefor, normally stationary transfer racks, movable yokes each containing a pair of intermeshed pinions, one pinion of each pair meshing with an actuator and the other with a transfer rack, means for differentially moving the yokes relative the transfer racks and thereby differentially driving the actuators, and means controlled by the totalizer for actuating the transfer racks to effect transfer movements of the actuators.

27. In a machine of the class described, the combination with a driving mechanism, of a totalizer, totalizer actuators, normally stationary transfer racks, movable yokes each containing a pair of intermeshed pinions, one pinion of each pair meshing with an actuator and the other with a transfer rack, manipulative means for differentially moving the yokes relative the transfer racks and thereby differentially driving the actuators, and means controlled by the totalizer for actuating the transfer racks during operation of the driving mechanism whereby to effect transfer movements of the actuators.

28. In a machine of the class described, the combination with totalizer actuators, of totalizer elements normally in engagement with the actuators, normally stationary transfer segments, movable yokes each containing a pair of intermeshed pinions, one pinion of each pair meshing with a totalizer actuator and the other with a transfer segment, means for differentially moving the yokes relative the transfer segments and thereby differentially driving the actuators and totalizer elements, and means controlled by the totalizer elements for positively operating the transfer segments to effect transfer movement of the actuators and totalizer elements.

29. In a machine of the class described, the combination with a driving mechanism, of totalizer elements, a rotatable shaft supporting said elements, means carried by the shaft for clearing the totalizer when the shaft is partially rotated, a manually operated device for partially rotating the shaft, means requiring operation of the driving mechanism to complete the movement of the shaft, and means preventing successive operations of the manually operated device without an intervening operation of the driving mechanism.

30. In a machine of the class described, the combination with a driving mechanism, of a totalizer, type carriers, manually operated devices for setting the type carriers under control of the totalizer, means whereby the first movement of said devices will start the operating mechanism and then lock it against further movement until adjustment of the type carriers is completed, means in turn locking the setting devices against further movement after the type carriers are set but before the devices have completed their movement, and means whereby operation of the driving mechanism will complete the movement of the setting devices and print the total.

31. In a machine of the class described, the combination with a driving mechanism, of a totalizer, type carriers, manually operated devices for clearing the totalizer and adjusting the type carriers to represent the total, means whereby the first movement of the clearing devices will start the driving mechanism and then lock said mechanism against further movement until the clearing is completed, means in turn locking the clearing devices against further movement after the clearing has been effected but before the devices have completed their movement, and means whereby operation of the driving mechanism will complete the movement of the clearing device and print the total.

32. In a machine of the class described, the combination with a driving mechanism, of totalizer elements, a rotatable shaft on which the elements are rotatably mounted, normally ineffective means for connecting the totalizer elements and the shaft to clear the elements, manually operated devices for rendering said means effective and for turning the shaft nine tenths of a rotation, and devices requiring operation of the driving mechanism to complete rotation of the shaft and restore the connecting means to normal condition.

33. In a machine of the class described, the combination with a driving mechanism, of totalizer elements, a rotatable shaft supporting said elements, means carried by the shaft for clearing the totalizer during rotation of the shaft, means whereby the shaft is adjusted to its starting point at the beginning of each operation of the driving mechanism, manually operable clearing devices for rotating the shaft, and means whereby the first movement of said manually operable devices will turn the driving mechanism far enough to effect adjustment of the shaft to its starting point.

In testimony whereof I affix my signature.

JOHN A. WERNER.